United States Patent [19]

Neseem et al.

[11] 4,282,426

[45] Aug. 4, 1981

[54] SLOT SCANNING SYSTEM

[75] Inventors: Syed Neseem; Denis M. Blanford; Gene L. Amacher, all of Cambridge, Ohio

[73] Assignee: NCR Corporation, Dayton, Ohio

[21] Appl. No.: 43,928

[22] Filed: May 30, 1979

[51] Int. Cl.³ .............................................. G04K 7/10
[52] U.S. Cl. .................................... 235/463; 235/462
[58] Field of Search ...................... 235/437, 462, 463; 371/20, 49; 235/437, 494; 250/555

[56] References Cited

U.S. PATENT DOCUMENTS

| | | | |
|---|---|---|---|
| 3,245,040 | 4/1966 | Burdett | 371/49 |
| 3,248,695 | 4/1966 | Dascotte | 371/49 |
| 4,056,710 | 11/1977 | Shepardson | 235/437 |
| 4,095,096 | 6/1978 | Harada | 235/494 |

Primary Examiner—Daryl W. Cook
Attorney, Agent, or Firm—J. T. Cavender; Wilbert Hawk, Jr.; Richard W. Lavin

[57] ABSTRACT

A symbol decoding system incorporated in a plurality of NMOS/LSI chips generates data representing numerical characters encoded in the symbol. Scanning means generates signals in response to the scanning of a plurality of bars and spaces, which signals are decoded by a first chip as valid and invalid characters, the valid characters being recognized by a second chip which stores the valid characters and enables a microprocessor chip to receive the valid characters assembled as part of the symbol for processing thereof. Logic circuits enable test numerical characters to be generated in response to test signals outputted by the microprocessor chip.

17 Claims, 46 Drawing Figures

FIG. 3  1: BLACK  0: WHITE

| DECIMAL NUMBER | LEFT SIDE (ODD PARITY) | RIGHT SIDE (EVEN PARITY) |
|---|---|---|
| 0 | 0 0 0 1 1 0 1 | 1 1 1 0 0 1 0 |
| 1 | 0 0 1 1 0 0 1 | 1 1 0 0 1 1 0 |
| 2 | 0 0 1 0 0 1 1 | 1 1 0 1 1 0 0 |
| 3 | 0 1 1 1 1 0 1 | 1 0 0 0 0 1 0 |
| 4 | 0 1 0 0 0 1 1 | 1 0 1 1 1 0 0 |
| 5 | 0 1 1 0 0 0 1 | 1 0 0 1 1 1 0 |
| 6 | 0 1 0 1 1 1 1 | 1 0 1 0 0 0 0 |
| 7 | 0 1 1 1 0 1 1 | 1 0 0 0 1 0 0 |
| 8 | 0 1 1 0 1 1 1 | 1 0 0 1 0 0 0 |
| 9 | 0 0 0 1 0 1 1 | 1 1 1 0 1 0 0 |

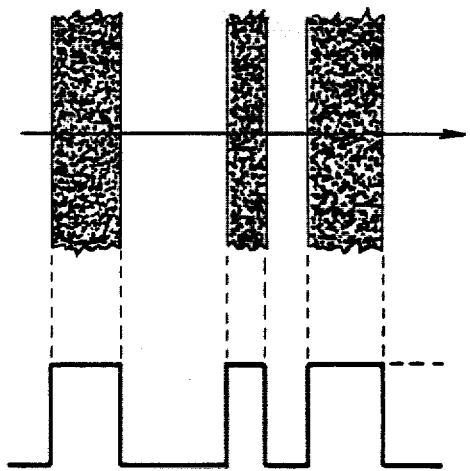
FIG.4A
FIG.4B
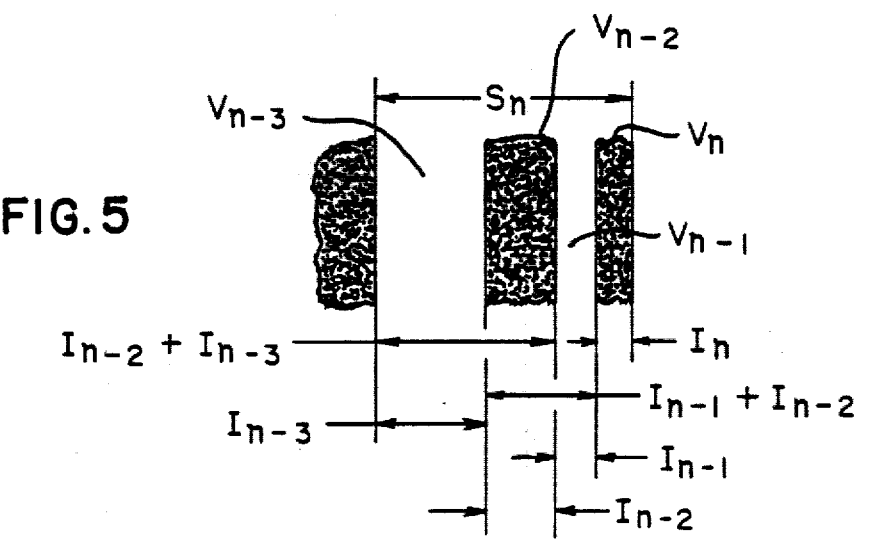
FIG.5

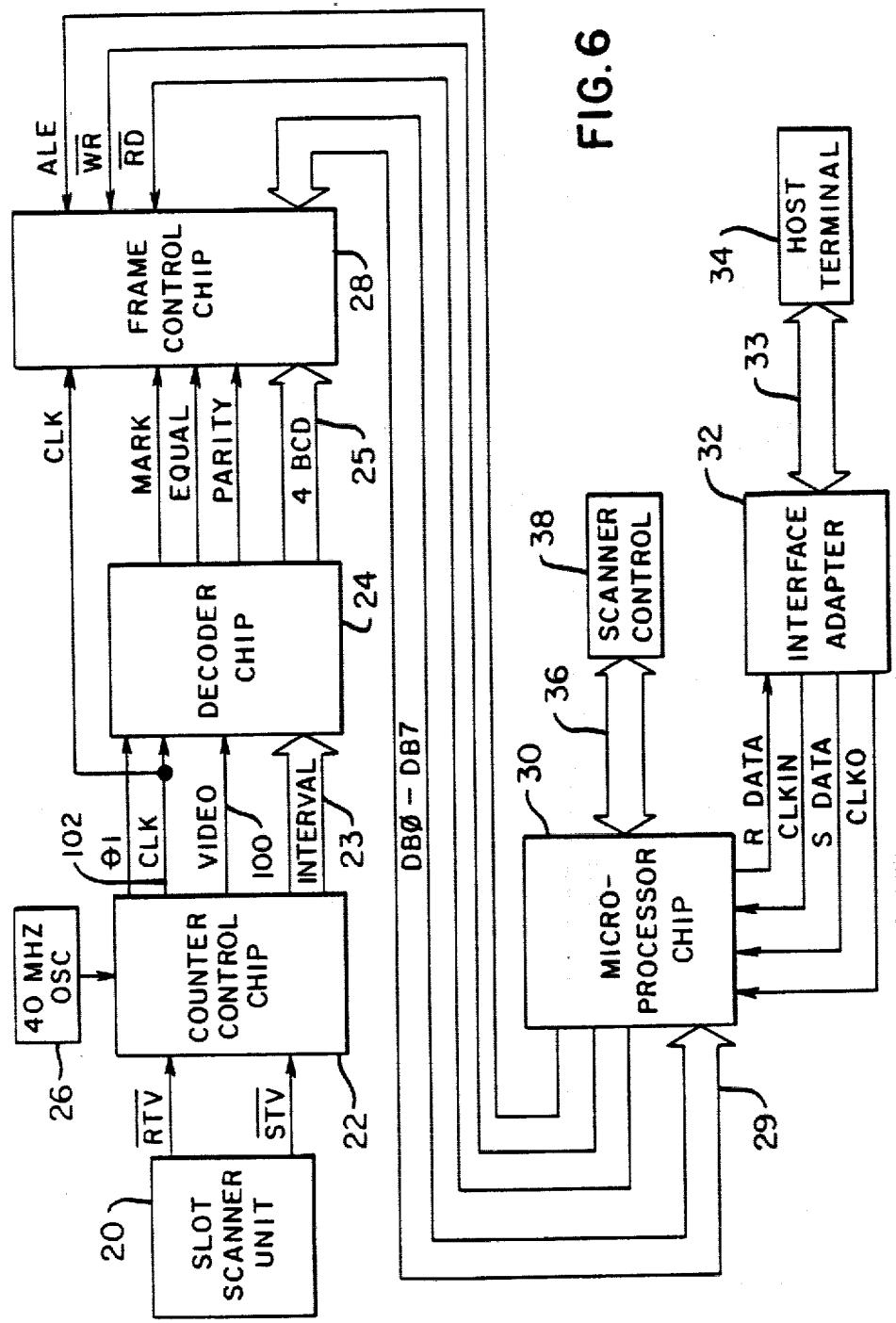

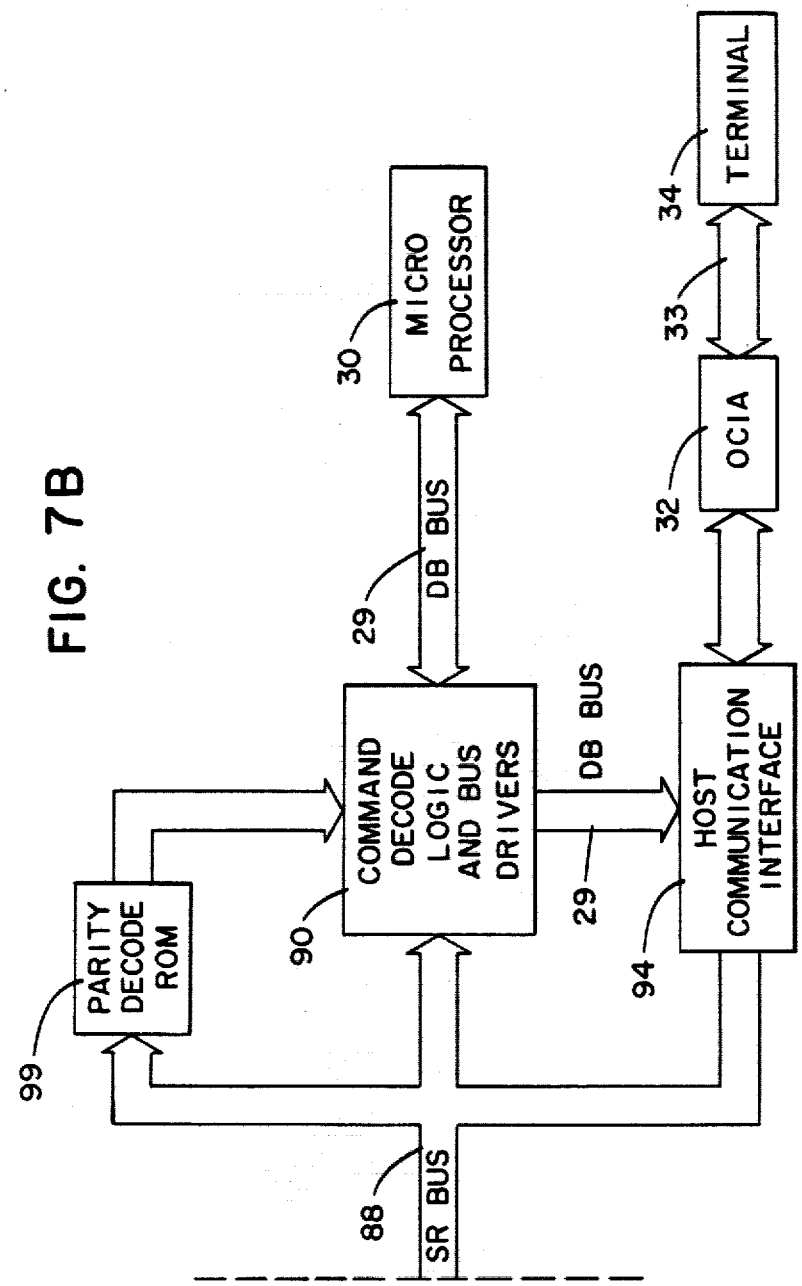

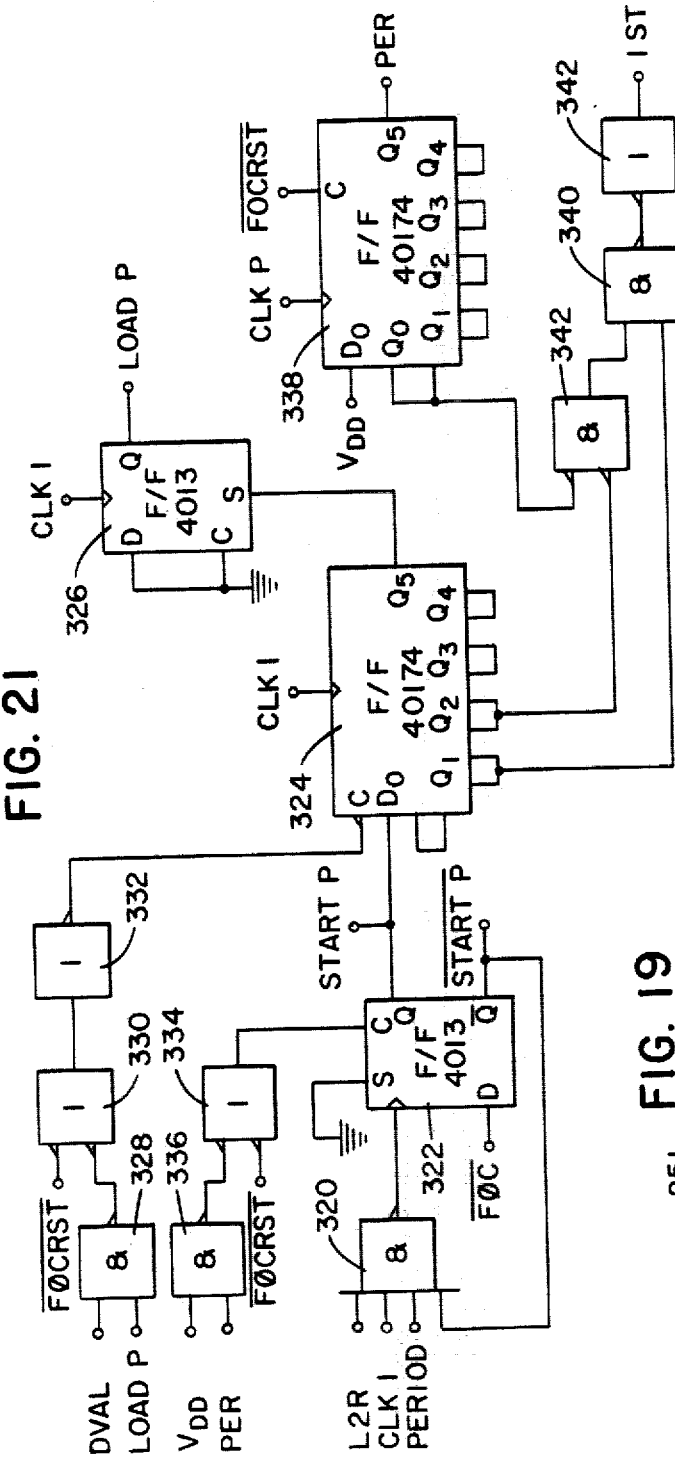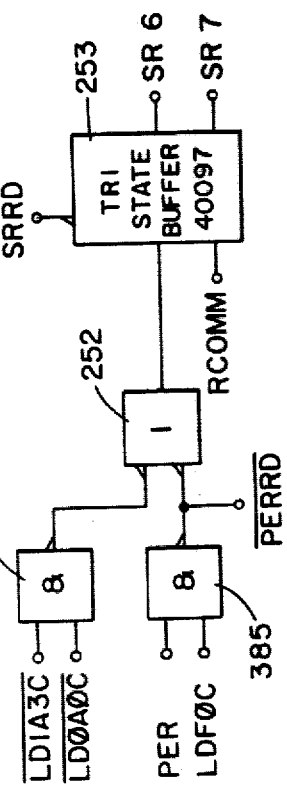
FIG. 21
FIG. 19

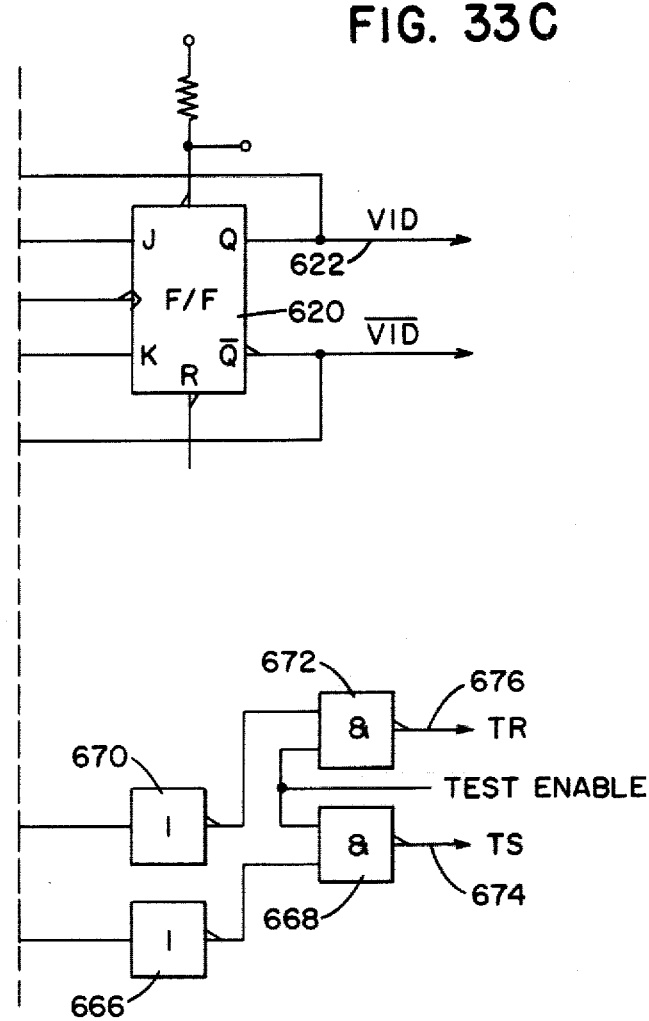

SLOT SCANNING SYSTEM

CROSS-REFERENCE TO RELATED APPLICATIONS

SYMBOL DECODING SYSTEM, co-pending application Ser. No. 043,933, filed on even date herewith, invented by Gene L. Amacher and Syed Naseem, assigned to the NCR Corporation.

SYMBOL PROCESSING SYSTEM, co-pending application Ser. No. 043,971, filed on even date herewith, invented by Denis Blanford and Syed Naseem, assigned to the NCR Corporation.

TOPOGRAPHY FOR I.C. PATTERN RECOGNITION ARRAY, co-pending application Ser. No. 043,929, filed on even date herewith, invented by R. Orgill and M. Janes assigned to the NCR Corporation.

TOPOGRAPHY FOR I.C. FRAME CONTROL CHIP, co-pending application, Ser. No. 043,930, filed on even date herewith, invented by H. Gardner and W. Gravelle, assigned to the NCR Corporation.

BACKGROUND OF THE INVENTION

The present invention relates to a novel method and means for decoding a high density multiple bar code from a record medium at a high rate of speed and more particularly, relates to an NMOS/LSI chip which receives superfluous data from a pattern recognition chip and extracts only the data which is valid. This valid data is then transmitted to a microprocessor for assembling into a readable form.

The use of bar coded symbols or labels intended to be read by optical scanning equipment as a means for identifying new data useful in processing items sold in the retail industry has been widely accepted to the point that a particular bar code known as the Universal Product Code (UPC) has been established as the industry standard for the grocery and other related retail industries. In the multiple bar code, such as the UPC, each decimal number or character is represented by two pairs of vertical bars and spaces within a 7-bit pattern wherein a binary 1 bit represents a dark module or bar of a predetermined width and a binary 0 represents a light module or space. Thus, the decimal or character 1 may be represented in the UPC code by the 7-bit pattern 0011001. In keeping with the format, the decimal 1 would be comprised of an initial space of a 2-bit width, followed by a 2-bit wide bar, another 2-bit space and a 1-bit wide bar. For each character or decimal of the system there are two bars and two spaces which have a total width of seven modules or bits. The width of each of the bars or spaces which comprise a character may be 1, 2, 3 or 4 modules wide as long as the sum of the bars and spaces is seven bits or modules wide.

A multiple bar code, such as the UPC, is normally read by an optical scanner which may take the form of a hand-held wand or a scanner mechanism located in a check-out counter. The optical scanner will scan the bar code pattern and generate signals representing the bars and space for transmission to the processing apparatus which determines the character represented by the bar code pattern.

Prior optical readers generally store the electrical signals generated as a result of scanning the bar code pattern until the accumulated signals stored are sufficient to allow the processing apparatus to initiate a recognition operation to determine the character represented by the scanned bar code pattern. Because of the speed in which the scanning operation is performed, the cost of the prior optical readers in processing the electrical signals has been unduly expensive, which in many instances has prevented the readers from reaching the marketplace. It is therefore the principal object of this invention to provide a low-cost optical character reader. It is another object of this invention to provide a low-cost optical character reader system which operates at a relatively high rate of speed without a loss of recognition efficiency. It is a further object of this invention to provide a microprocessor controlled semiconductor integrated decoding circuit for decoding a bar code symbol such as the UPC symbol and for generating diagnostic routines for the decoding circuits.

SUMMARY OF THE INVENTION

In order to carry out these objects, there is provided a high speed optical character reader system which includes a slot scanner mechanism for scanning the bar portion of a symbol or coded tag which bar pattern includes a plurality of bars and spaces and timing means for generating data representing the bar pattern scanned. The data obtained by scanning the tag is decoded by a pattern recognition array incorporated in an NMOS/LSI chip, and then transmitted to a second NMOS/LSI chip which includes a plurality of buffers, flip-flops, shift registers, and discrete logic elements. This chip receives the data, much of which is invalid, and separates it into four groups. When the data stored in one of the groups is determined to be valid, it is sent to a microprocessor chip. From this valid data, the microprocessor can determine: in which direction the tag was scanned; the type of tag being scanned, whether the segment read is a left half or right half of a tag and if a valid read operation has occurred. The microprocessor controls the timing means to generate routines for testing the circuits in the NMOS/LSI chips. Other features and advantages of the present invention will be apparent from the preferred embodiment hereinafter set forth and illustrated in the accompanying drawings.

BRIEF DESCRIPTION OF THE DRAWINGS

FIG. 3 is a table showing the code structure of the UPC symbol character;

FIGS. 4A and 4B are graphical representations of the bar pattern and the transformed binary symmetrical signal;

FIG. 5 is a graphical representation of a bar code illustrating the dimensional relationships utilized in the present recognition system; and FIG. 6 is a block diagram of the various arrays which comprise the pattern recognition and scanning system.

FIGS. 7A and 7B taken together show a block diagram of the frame control array, including the terminal and microprocessor interfaces;

FIG. 19 is a diagram showing the logic circuit for controlling the SR6 and SR7 data lines of the SR data bus;

FIG. 21 is a diagram showing the periodical label capture logic;

FIGS. 33A, 33B and 33C taken together is a detailed block diagram of the interval counter control together with the Johnson counter;

DESCRIPTION OF THE PRESENT EMBODIMENT

Figure 1:
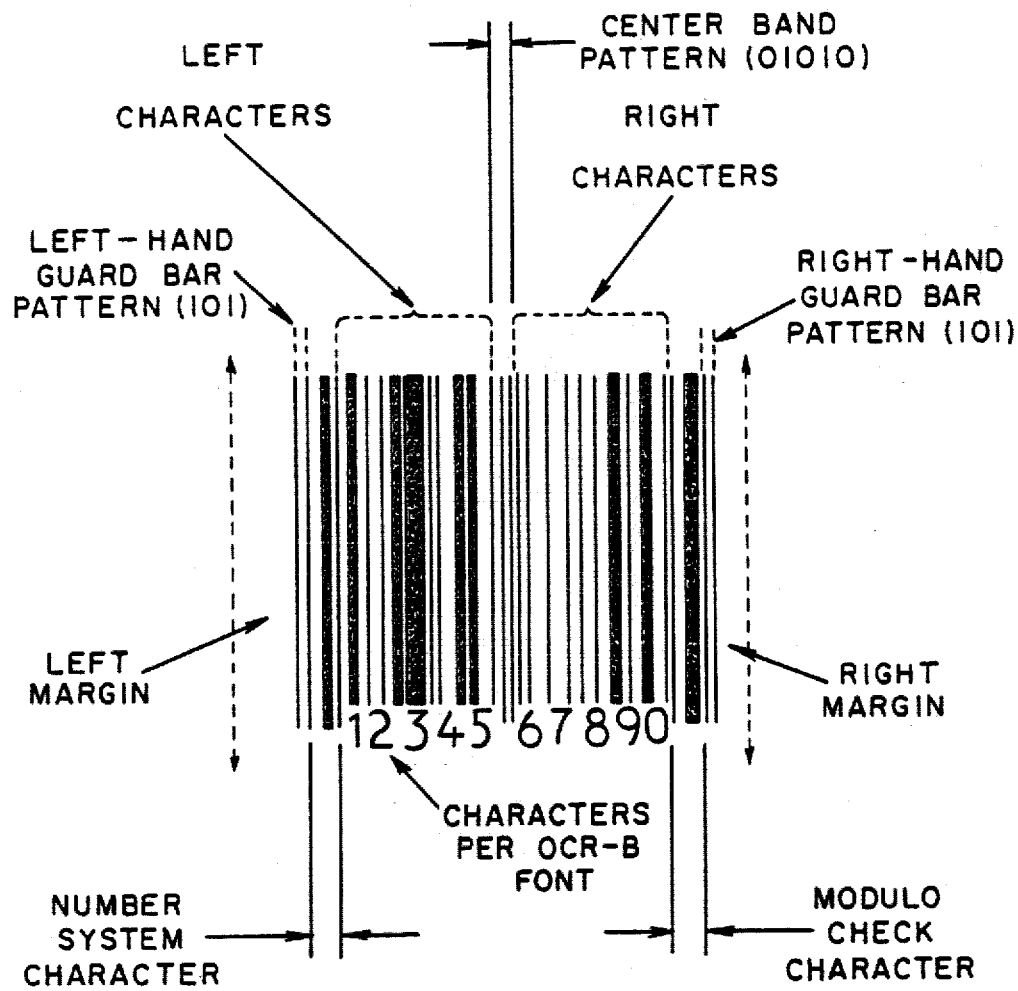
FIG. 1 is a graphical representation of a symbol or coded label such as a UPC coded symbol.

Referring now to FIG. 1, there is shown a graphical representation of a UPC symbol or coded label. The UPC symbol is made up of a series of light and dark parallel bars which comprise twelve characters. Among the twelve characters, two characters are the industry code and a modulo check character, the remaining ten characters are the main code representing data associated with a merchandise item. As shown in FIG. 1, a readable number printed in OCR-B font is added. In addition to the series of light and dark parallel bars, the UPC symbol includes spaces on both side which are referred to as the left and right margins. Other characteristics of the UPC symbol include the following:

(1) The overall shape of the symbol is rectangular;

(2) Each character of a UPC code is represented by two dark bars and two light spaces;

(3) Each character is comprised of seven equal data elements called modules;

(4) Each module can be light or dark;

(5) Each bar may be composed of 1, 2, 3, or 4 dark modules. Light spaces may also be composed of 1, 2, 3, or 4 modules;

(6) Each character is independent;

(7) The right-most character of the symbol is a modulo check character while the left-most digit of the symbol indicates a system in which this symbol is encoded;

(8) The size of the UPC symbol is variable, that is, it may be large or small without affecting its readability. The UPC symbol may consist of only six characters having the same arrangement as shown in FIG. 1;

(9) The series of light and dark parallel bars are separated from the margins on each side by left and right guard bar patterns and includes a center band pattern located at the center of the UPC symbol.

Figure 2:
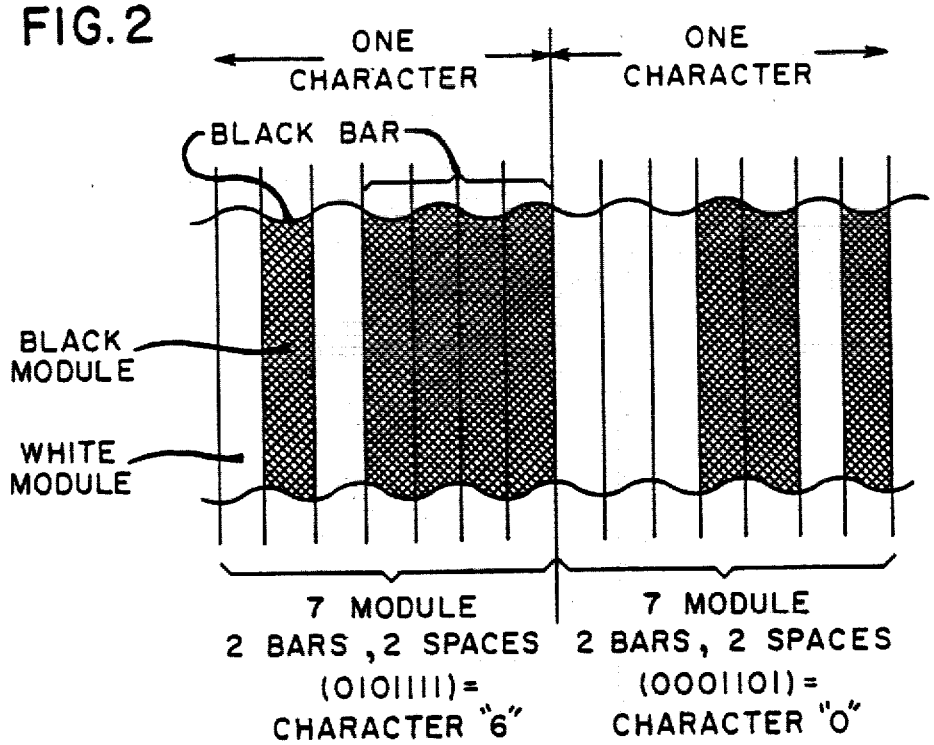
FIG. 2 is a graphical representation of the character structure of the UPC symbol.

Referring now to FIG. 2 there is shown a graphical representation of the character structure of the UPC symbol. As shown, each encoded UPC character is made up of two dark bars and two light spaces each composed of a differing number of modules. By assigning a 1 which corresponds to the black module and a 0 to a white module, the lefthand character represents (0101111) which denotes the character 6 and the right hand character represents (0001101) which denotes the character 0. The structure of the character code is not uniquely determined by each character, but is different according to which side of the center band pattern the character is located on. It is thus arranged that the light modules and the black modules are reversed as the character is located on the right or left sides, and as a result an odd number of black modules is included in each character code on the left hand side and an even number of black modules is included in each character code on the right hand side as indicated in FIG. 3. This parity relation provides information for determining the read-out direction of the codes. With this arrangement, the left-hand characters always start with light bars and the right-hand characters always start with dark bars (reading left to right). The whole structure of the character codes is as shown in the Table in FIG. 3. It should be noted that the number of dark modules in the left side digit is always 3 or 5 while the number is always 2 or 4 for the right hand digit. These characteristics are used as a parity check. The left side digits have odd parity while the right side digits have even parity.

After a character is scanned, each module is assigned a binary value. Thus, as shown in FIGS. 4A and 4B, scanning of the modules in the direction as noted, a binary 1 signal is generated upon the sensing of a black bar, while a binary 0 signal is generated upon the sensing of a light bar or space. Because of problems in printing, it is uncommon for the width of the light bar and the black bar to be of the ideal value. Therefore, in decoding the UPC symbol, this condition must be taken into consideration.

In addition, the tolerances for a UPC symbol or tag are larger for the space that starts or ends a character.

Because of the print condition of the bar and space alluded to above, it has been found that the dimension tolerances between similar edges are better than between dissimilar edges, that is, measuring the distance between trailing edges of adjacent bars and spaces or measuring the distance between the leading edges of adjacent bars and spaces produces data which give high recognition efficiency to the system.

Referring now to FIG. 5, there is illustrated the present method for recognizing the characters represented by the pattern of the UPC bar code as shown in FIG. 1. As previously described, each character comprises two dark bars and two white bars or spaces. Representing each bar and space as an interval, it will be seen that each character is composed of four intervals, where each interval is composed of the same background, either dark or white. To represent the most recent interval that has been sensed by the scanner, the designation $I_N$ is used with the designation $V_N$ representing the bar for that interval. The designation $I_N$ is an 11 bit binary number generated in a manner to be described hereinafter. To designate the interval preceding the current interval, the notation $I_{N-1}$ and $V_{N-1}$ is used. For the interval before that, the notation $I_{N-2}$ and $V_{N-2}$ is used and so on. The sum of the four consecutive intervals scanned by the scanner is shown in FIG. 5 by the notation $S_N$ where $S_N$ equals $I_N$ plus $I_{N-1}$ plus $I_{N-2}$ and $I_{N-3}$. For each interval scanned, the system examines the three preceding scanned intervals together with the current scanned interval and assigns a hexadecimal value. Each interval that is scanned is then classified as a bar (binary 1) or a space (binary 0). If $V_N$ is a binary 1 (bar), then $I_N + I_{N-1}$ and $I_{N-1} + I_{N-2}$ are compared to one half $S_N$, $23/64$ $S_N$ and $41/64$ $S_N$. From this comparison two sets of weights can be found. Each of these weights will be either 2, 3, 4 or 5. From these weights the system will determine if a character is odd or even parity. Further utilizing these weights, the system will establish the characters 0, 3, 4, 5, 6, and 9. However, two sets of ambiguous characters are found. The characters 1 and 7 are ambiguous, that is, both have the same apparent configuration, and also the characters 2 and 8. To distinguish between the characters 2 and 8 requires finding if the interval $I_{N-1}$ of each character is greater than the interval $I_{N-2}$. If it is greater, the character is 2. Odd parity 1 and 7 can be separated by determining if intervals $I_N$ is greater than the interval $I_{N-1}$. If in this case it is greater, the character is a 1. Even parity 1 and 7 requires that the term $21/32$ $I_{N-2}$ is greater than $I_{N-1}$. In this latter case, if the term is greater, the character is a 1. In all of these cases, the single intervals were all used to determine the ambiguous characters.

Upon the scanning of each interval, the system will sum the three previous intervals together with the current scanned interval and then compare the sum of those four intervals $S_N$ (FIG. 5) with the previous sum $S_N$ generated to determine if they are equal within a predetermined limit. Thus, a signal EQUAL indicating equality will be generated if $27/32$ $S_N$ is less than $S_{N-4}$ and $S_N$ is greater than $27/32$ $S_{N-4}$ and no error is detected. An error condition exists where the width of an interval exceeds the predetermined count.

Referring to FIG. 1, it will be seen that the bar code symbol has left and right margins and the center band portion of the code. When scanning from left to right as viewed in FIG. 1, the left margin will be characterized as the in margin while the right margin will be characterized as the out margin. Similarly, the left portion of the center band will be characterized as the in center band and the right portion of the center band will be characterized as the out center band. These characteristics are reversed where the scanning takes place from a right to left direction. In order to identify this condition, the hexadecimal number being generated as a result of scanning each interval will indicate whether the interval scanned is a part of the in or out margin or the in or out center band is generated. The in margin is detected if there is a wide space interval adjacent to a guard bar. Thus, if $(I_{N-6} + I_{N-7})$ $5/16$ is greater than $I_{N-4} + I_{N-5}$ and $S_N$ is less than $27/32$ $S_{N-4}$ and $V_{N-4}$ and $V_{N-5}$, the interval is part of the in margin and a bit in the hexadecimal output number will indicate such a condition. With respect to the out margin, if $(I_N + I_{N-1})$ $5/16$ is greater than $I_{N-1} + I_{N-2}$ and $S_{N-4}$ is less than $27/32$ $S_N$ and $V_{N-3}$ and $V_{N-2}$, the interval is part of the out margin and the hexadecimal number generated by the system will indicate such a condition. The outcenter band will be detected if an ambiguous character (1, 7, 2 or 8) is detected and if $S_N$ is less than $27/32$ $S_{N-4}$ and $V_N$ of the current interval together with the $V_{N-1}$ together with the next interval scanned being any ambiguous character and the in margin is not detected, the hexadecimal number being outputted by the system will indicate the interval is part of the out center band. The in center band will be detected if any ambiguous character is detected as $S_{N-4}$ is less than $27/32$ $S_N$ and $V_{N-5}$ and $V_{N-4}$ together with the finding of the previous interval is an ambiguous character and if the out margin had not been detected, the hexadecimal output number will indicate that the interval is a portion of the in center band. It will thus be seen that upon the scanning of each interval, the system will apply in parallel the above-cited logic test to determine the characteristics of the scanned interval, which characteristics are embodied as part of the binary hexadecimal number together with the additional binary bits generated for use in recognizing the character contained in the hexadecimal number being outputted at that time. As pointed out previously, each interval scanned will result in the outputting of a hexadecimal number which contains four binary-coded decimal (BCD) bits with only a portion of the hexadecimal numbers outputted being valid.

Referring now to FIG. 6 there is shown a block diagram of the character recognition system in which the present embodiment is utilized including a slot scanner 20 which causes a laser beam to be reflected to produce a scanned pattern above and in front of a slot or opening adjacent the laser. If a UPC symbol or tag is placed such that the laser beam crosses the tag thereby reflecting the light from the bars and spaces which compose the UPC tag, a photodetector receiving the reflected light will transform the reflected light into an electrical signal. A video amplifier (not shown) located in the scanning unit generates, in response to the generated electrical signals, digital pulses $\overline{STV}$ (Set Video) indicating a space to bar transition and $\overline{RTV}$ (Reset Video) indicating a bar-to-space transition. The time interval between three pulses is a function of the width of the bar or space. The pulse width of the signals $\overline{STV}$ and $\overline{RTV}$ can be from 25 ns. to 2 us sec. Valid signals alternate are never closer together than 350 ns. This means that following a valid $\overline{STV}$ or $\overline{RTV}$, multiple pulses may occur during this 350 ms. time period.

These time intervals are transmitted to a counter control chip 22 (FIG. 6) in which the intervals are converted to a binary number by an interval counter 544

Figure 31A:
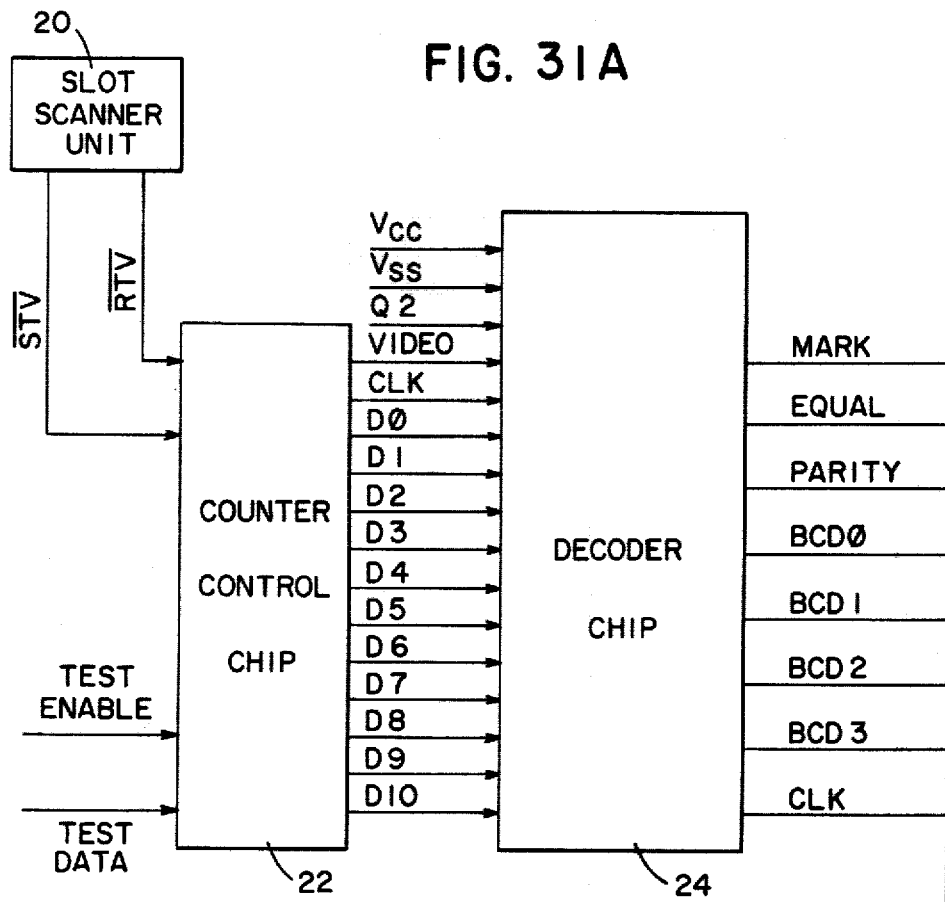
FIG. 31 is a block diagram of the decoder system of FIG. 6 incorporated in semiconductor integrated circuits.
Figure 33A:
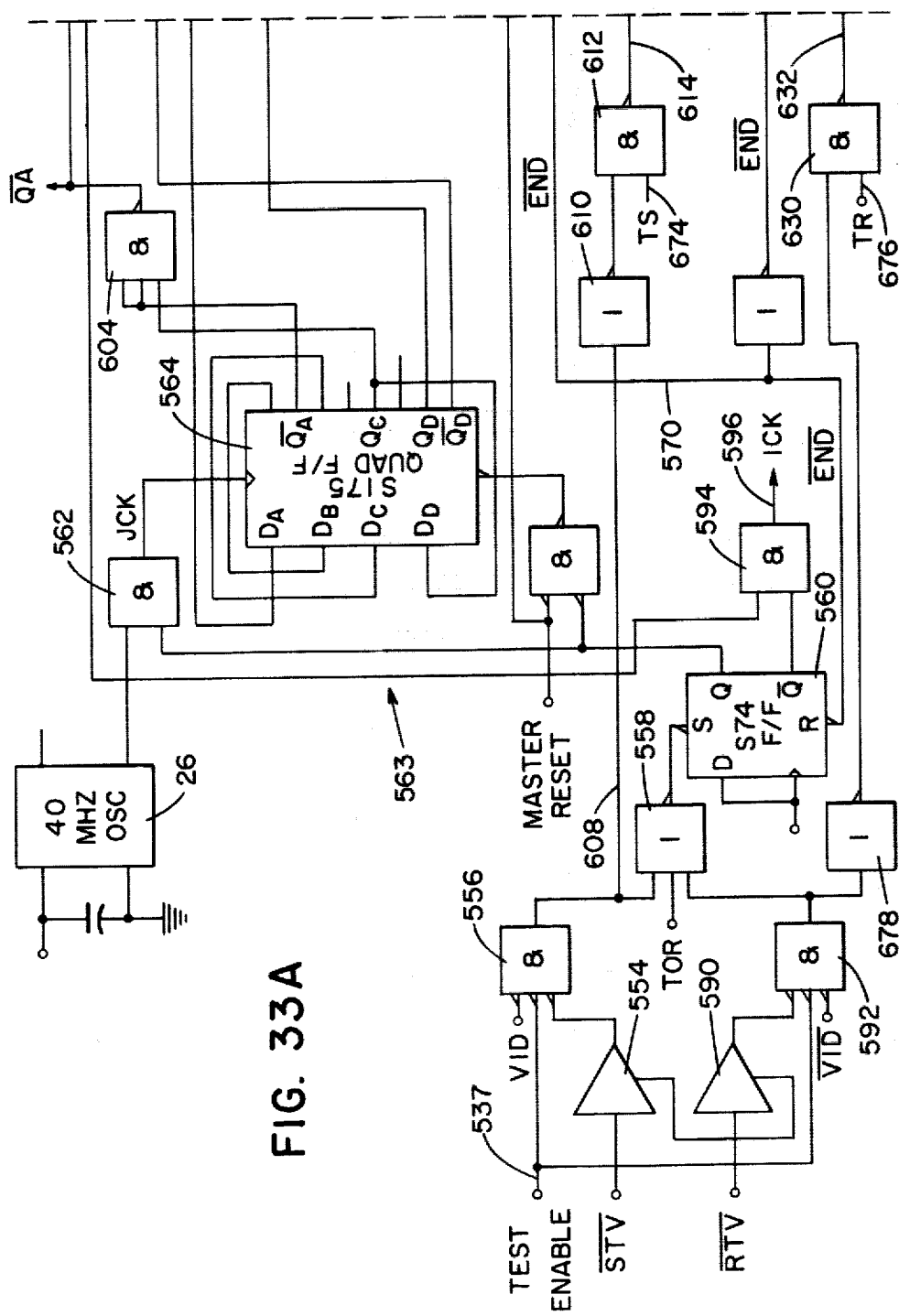
Figure 34A:
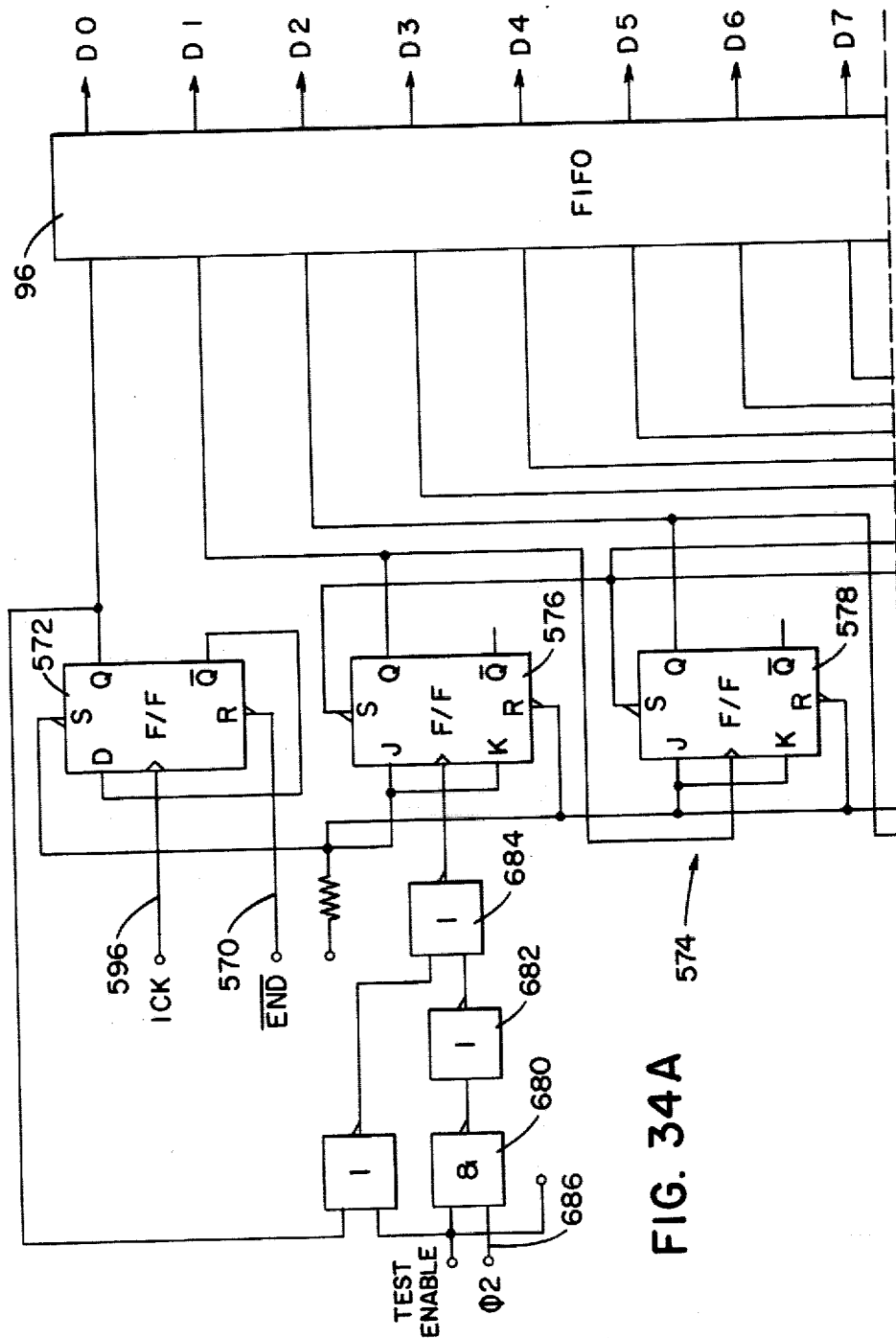
FIGS. 34A, 34B and 34C taken together is a detailed block diagram of the interval counter and the FIFO storage unit.
Figure 34B:
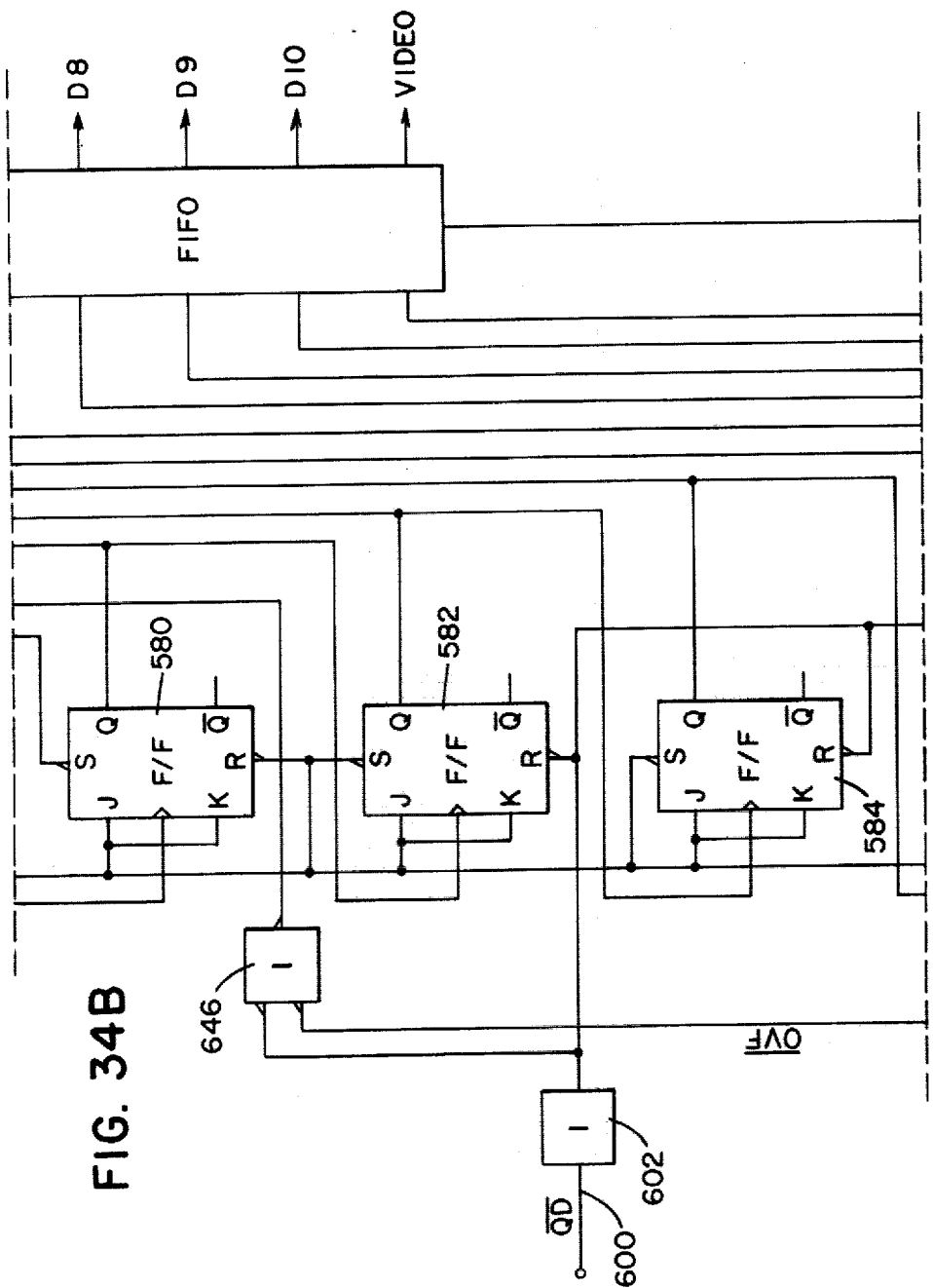
Figure 34C:
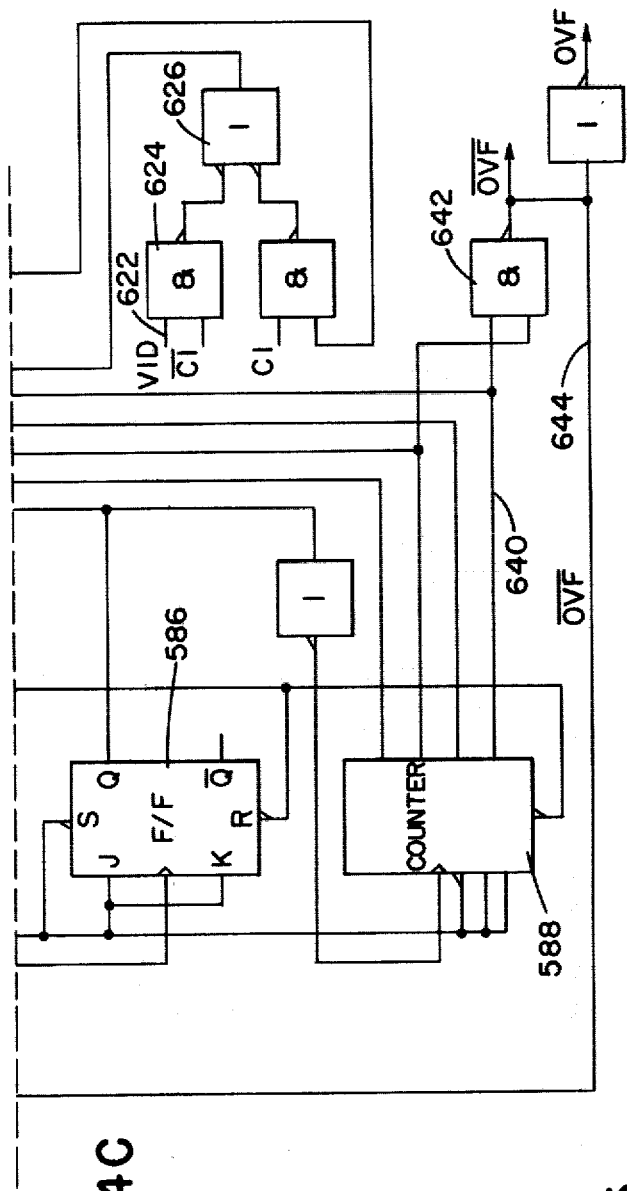

(FIGS. 34A–34E inclusive) and then transmitted to a FIFO (First-In, First-OUT) storage unit 96 (FIGS. 34A–34C inclusive). The FIFO time averages the time between intervals to an acceptable period. Either of the signals STV and RTV will stop the interval counter and cause that interval count along with the state of a VIDEO flip-flop 620 (FIG. 33C) to be stored in the FIFO. The VIDEO flip-flop 620 will be outputting the signal VID (FIG. 33C) which is high for a bar and low for a space. The interval counter 544 at this point is reset and the next interval count is started. If the output of the interval counter is greater than 1280 counts (32 us.), an overflow condition is created. In the overflow state, every 800 ns. of the count of 1280 and the last state of the VIDEO flip-flop will be loaded into the FIFO 96. The occurrence of the next STV or RTV signal will result in the loading of an additional 1280 count into the FIFO. This condition will cause an error signal to be generated which, as will be described more fully hereinafter, will be sensed by the system at this time. Using this error signal, the system will disregard the data that is being generated by the slot scanner unit 20 and the counter control chip 22. The data contained in the FIFO 96 located in the counter control chip 22 will be outputted to a decoder chip 24 under the control of clock pulses generated by a 40 Mhz, oscillator 26 (FIG. 31A). The FIFO 96 will output 11 bits of binary data representing the width of the interval being scanned over bus 23 (FIG. 6) together with a VIDEO signal indicating whether the interval is a bar or a space. Also outputted from the counter control chip 22 to the decoder chip 24 are clock pulses CLK.

The decoder chip 24 (FIG. 6) contains a number of binary adders, comparators, shift registers and discrete logic elements which are used to decode the data being scanned by the slot scanner unit 20. The decoder chip 24 will output a hexadecimal number which includes four BCD bits representing a decimal character in addition to indicating margins, center bands and error. Three additional binary bits are outputted by the decoder chip 24 which represent the signal MARK to indicate the interval is a bar or a space, the signal EQUAL indicating that the current interval taken together with the three previous intervals are either equal or not equal in width to the previous four intervals and the signal PARITY indicating that the interval is odd parity if true or even parity if false, thereby locating the interval on the left or right side of the center band.

The output signals from the decoder chip 24 are transmitted to a frame control chip 28 (FIG. 6) which is the subject of the present invention and which separates the valid data from the invalid data being outputted by the decoder chip 24. The frame control chip 28 filters out this valid data by checking for framing characters, that is, in and out margins, in and out center bonds, and character equality to identify the valid characters being decoded by the decoder chip 24. A good segment of valid data is then transmitted over bus 29 to a microprocessor chip 30 for further processing. The frame control chip 28 functions also as a communication adapter for transmitting data to be sent from the microprocessor through an interface adapter 32 to a host terminal 34 over bus 33. The microprocessor chip 30 monitors photodetectors in the slot scanner unit 20 to determine when an item is in position to be read by the slot scanner. This data is transmitted to the microprocessor 30 over a bus 36 coupled to a scanner control unit 38. Upon receiving the required control signals, the microprocessor will then start monitoring the frame control chip 28 for information. The microprocessor does correlation analysis and modulo ten check to determine if it has a valid tag. Once a valid tag is assembled, the data is transmitted to the host terminal through the interface adapter 32. Reference should be made to the previously cited co-pending applications Ser. No. 043,933 and 2881 for a full disclosure of the decoder chip 24 and the co-pending applications Ser. Nos. 043,971 and 043,930 for a full disclosure of the frame control chip 28, each of the co-pending applications filed on the same date as the present application and each assigned to the present assignee of the application, which disclosures are fully incorporated into this application by reference.

Figure 7A:
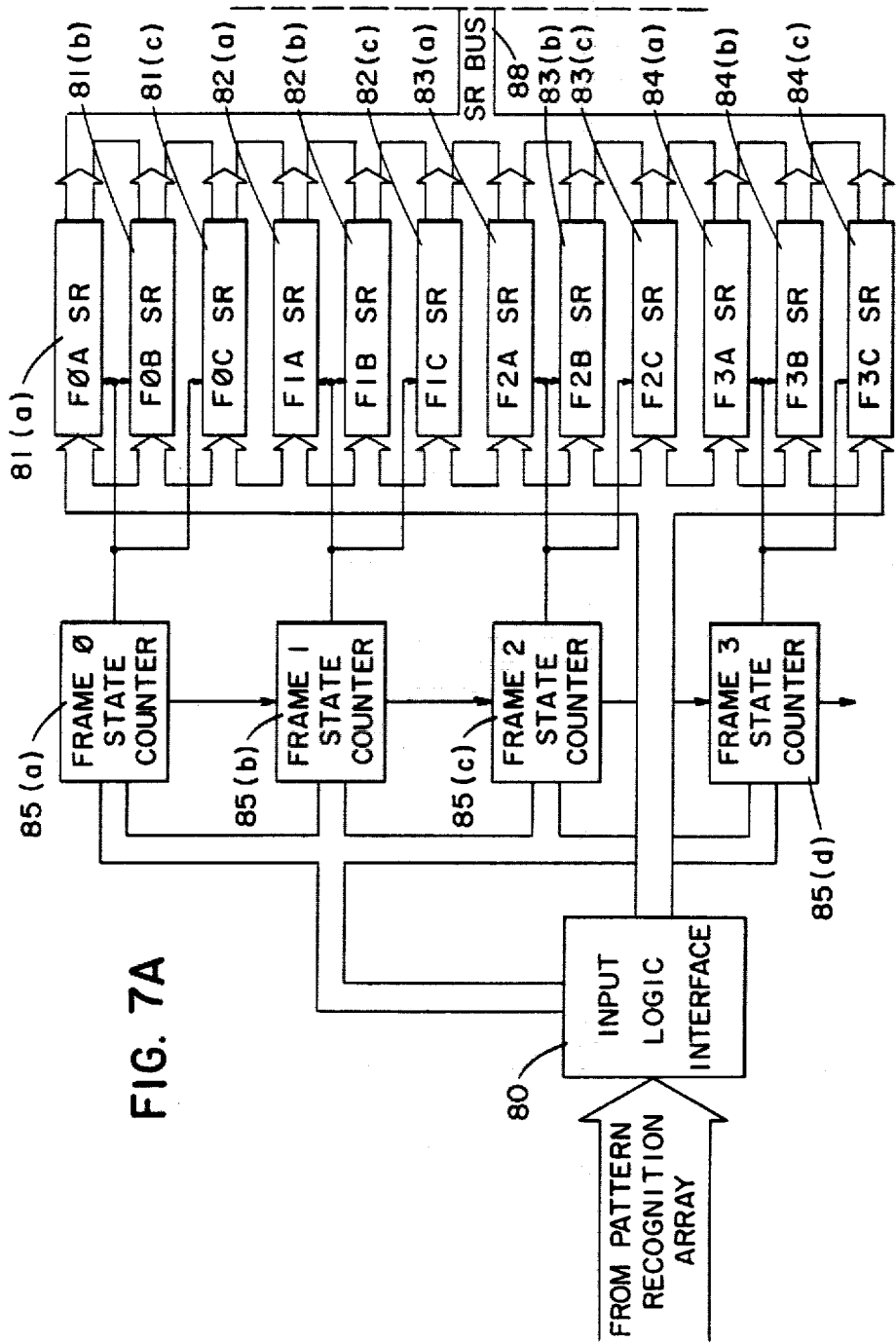

The basic circuit configuration of the present invention is illustrated in FIGS. 7A and 7B. The input logic interface 80 receives data from the pattern recognition array located in the decoder chip 24 (FIG. 6). The input interface logic 80 includes an input latch, a BCD function decoder, a frame decoder, and a shift register data latch.

Four binary coded hexadecimal data bits plus a parity bit which are received from the decoder chip 24 (FIG. 6) are outputted from the input logic interface 80 to each of a group of twelve shift registers 81a–c, 82a–c, 83a–c, and 84a–c, (FIG. 7A) which are used to capture valid data. The capture of the data by the shift registers is controlled by four frame state counters 85a–d. These four counters use the data generated by the BCD function and frame decoders transmitted from the input interface logic 80 to decide which segments of data are valid and should be captured. The shift register in which the valid data is contained notifies the microprocessor 30 (FIG. 7B) when a valid segment is captured.

The valid data is transmitted over the SR data bus 88 (FIGS. 7A and 7B) to the command decode logic 90 (FIG. 7B), which also contains bus drivers. This interface sends the valid data to the microprocessor 30 over the microprocessor data bus DB 29.

The SR data bus 88 also connects the command decode logic 90 with a host communication interface 94. This interface is necessary to couple the microprocessor with a peripheral device, such as a terminal 34. The terminal is linked to the communication interface 94 via an optically coupled interface adapter (OCIA) 32 over bus 33. When the microprocessor 30 wishes to send data to the terminal 34, the data travels over the DB bus 29 to the host communication interface 94, which in turn signals the terminal 34.

The terminal 34 sends data to the microprocessor 30 in a similar manner. The terminal 34 clocks the data via the OCIA 32 to the host communication interface 94, which notifies the microprocessor 30 that there is data waiting. The microprocessor 30 then transmits a signal to the interface 94 which loads the data onto the SR data bus 88 for transmission to the command decode interface 90. The interface 90 transfers the data from the SR bus 88 to the DB bus 29 and sends the data to the microprocessor 30.

The parity bit of the valid data segment appearing on the SR bus 88 is detected by a parity decode ROM 99. The ROM 99 receives the parity data from the SR bus 88 and sends the decoded information to the command decode logic 90, which sends the information to the processor 30 via the DB bus 29.

Figure 8:
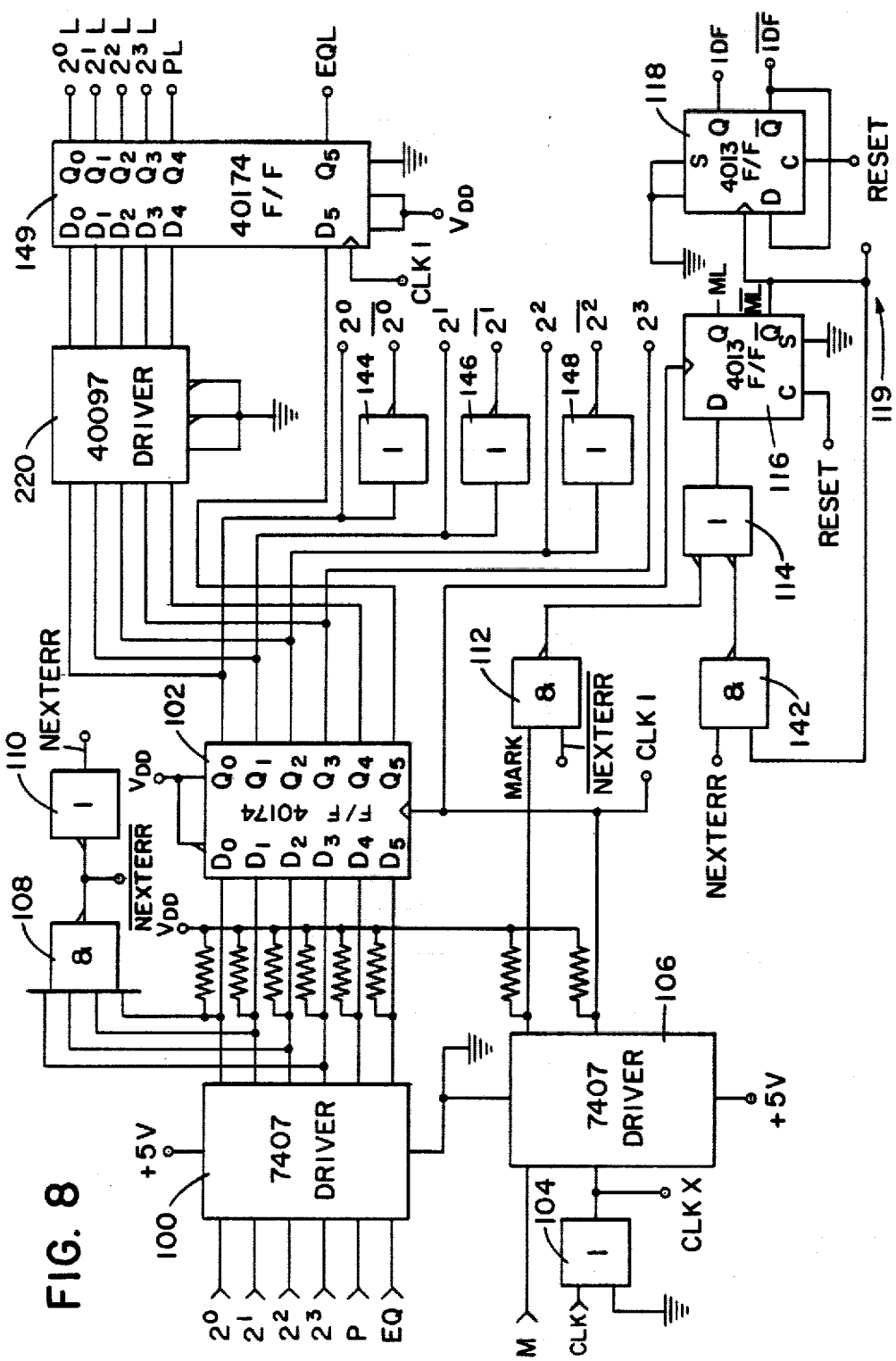
FIG. 8 is a diagram showing the data latch section of the input interface logic.

The data outputted from the pattern recognition array in the decoder chip 24 (FIG. 6) consists of seven bits: four bits define a hexadecimal number, one bit detects parity, one bit detects equality, and one bit, called a MARK bit, tells whether the data represented is a space or a bar. As shown in FIG. 8, the four hexadecimal data bits ($2^0$-$2^3$) plus the PARITY bit P and the EQUAL bit EQ are transmitted through a line driver 100 and are clocked into a flip-flop 102 by CLK1. CLK1 is generated by transmitting a clocking signal CLK through a gate 104 and a line driver 106. The four hexadecimal data bits ($2^0$-$2^3$) are inputted to a NAND gate 108 whose output signal $\overline{\text{NEXTERR}}$ is inverted by a gate 110. The signal NEXT ERR, outputted from gate 110, is present when all four data bits are present, and it indicates that an error has been detected by the pattern recognition array.

Figure 9:
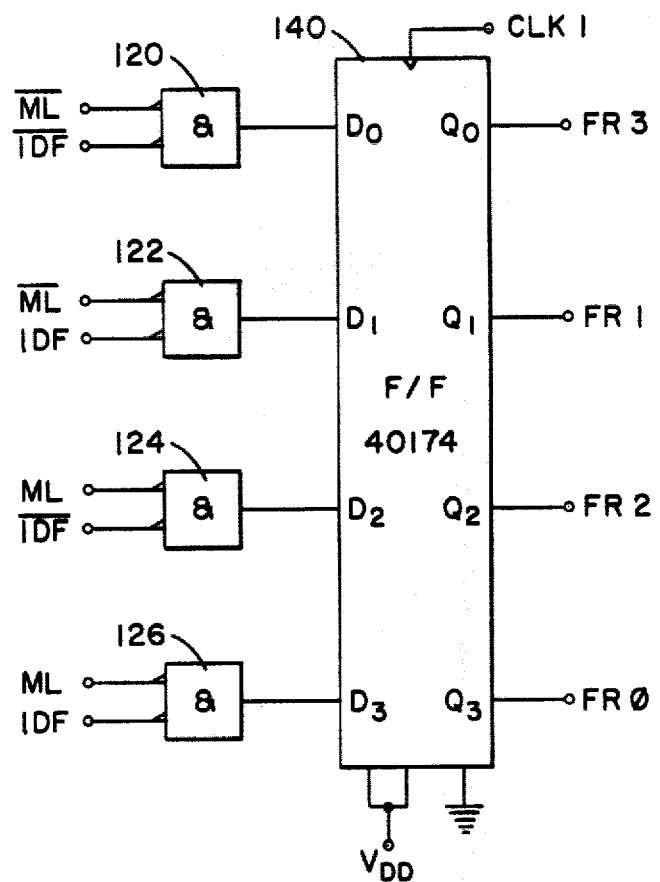
FIG. 9 is a diagram showing the frame decode section of the input interface logic.

The MARK bit M (FIG. 8) is transmitted through a driver 106 and is coupled with a signal $\overline{\text{NEXTERR}}$ outputted from NAND gate 108 via a NAND gate 112. The output of gate 112 is connected to the inverted input of an OR gate 114. The output of gate 114 enables a flip-flop 116, which, together with a flip-flop 118, comprise a two bit binary counter 119. As each interval of data is received from the pattern recognition array, the counter increments once, generating a total of four states. The output signals ML and $\overline{\text{ML}}$ (Mark Latch) of flip-flop 16, and the output signals IDF and $\overline{\text{IDF}}$ (ID flip-flop) of flip-flop 18, are decoded by gates 120-126 (FIG. 9) whose output decoded signals are latched into flip-flop 140. The four output signals of the flip-flop 140 indicated in FIG. 9 are the decoded reference frames FRφ, FR1, FR2, and FR3, which clock the input data from the pattern recognition array into the proper shift registers.

Any time the input data being read corresponds to a bar or space located in the symbol (FIG. 1) between the in margin and the center band, there will always be either a frame 1 or a frame 3 capture. When the bar or space is between the center band and the out margin, there will always be either a frame φ or a frame 2 capture. As shown in FIG. 8, the signal ML which appears on the Q output of flip-flop 116 is coupled with the signal $\overline{\text{NEXTERR}}$ appearing on the output of the inverter 110 (FIG. 8) by a NAND gate 142, whose output is connected to the second inverted input of an OR gate 114 which gate enables the counter 119 to advance one count upon the occurrence of the signal NEXTERR going low when the signal $\overline{\text{ML}}$ is high.

As shown in FIG. 8, the $2^0$, $2^1$, and $2^2$ bits of the BCD data being outputted from flip-flop 102 are inverted by gates 144-148. The EQUAL bit EQ appearing on the $Q_5$ output of flip-flop 102 is transmitted to a flip-flop 149. The $2^0$, $2^1$, and $2^2$ bits from flip-flop 102, the $\overline{2^0}$, $\overline{2^1}$, and $\overline{2^2}$ bits, appearing on the output of the inverters 144-148 inclusive, and the $2^3$ bit are decoded by AND gates 150-158 (FIG. 10) whose output signals are latched into a flip-flop 164. The output signals of flip-flop 164 indicate whether a segment of data transmitted from the pattern recognition array represents an out margin ($\overline{\text{OUTMARG}}$), in margin ($\overline{\text{INMARG}}$), out center band ($\overline{\text{OUTCB}}$), in center band ($\overline{\text{INCB}}$), or error ($\overline{\text{ERR}}$).

Each of the output signals FRφ, FR1, FR2, and FR3 from the flip-flop 140 (FIG. 9) is applied to one of the frame state counters 85a-d (FIG. 7A). The operation of the FRφ counter 85(a) and the FR1 counter 85(b) will be described here, with the understanding that the FR2 counter 85(c) operates in a similar manner to FRφ, and the FR3 counter 85(d) similar to FR1.

Figure 10:
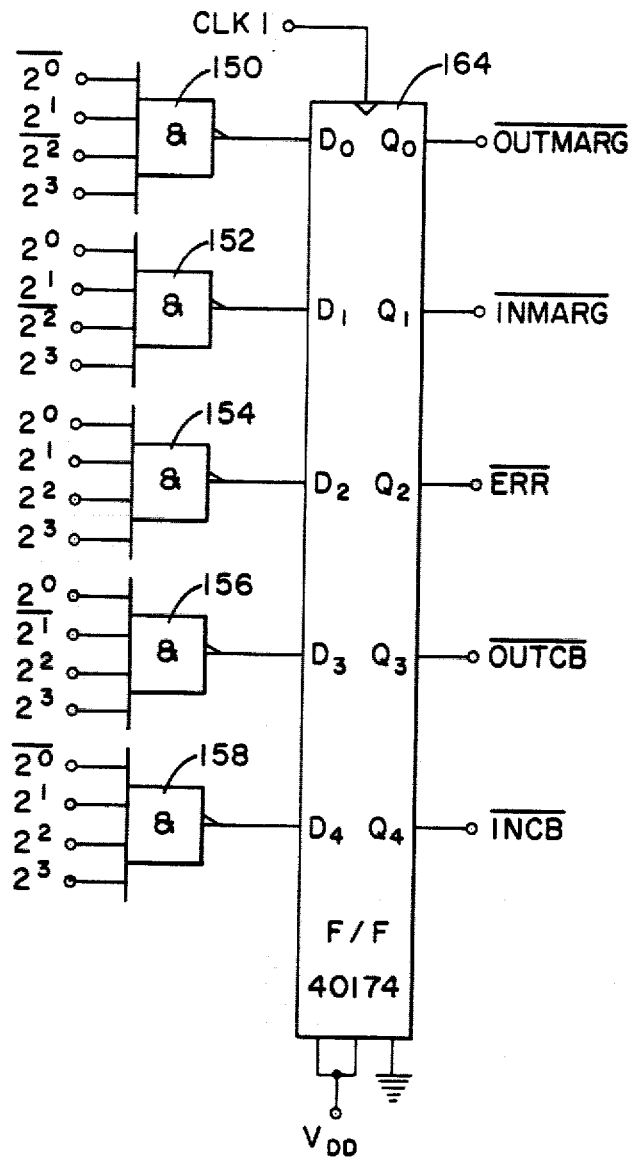
FIG. 10 is a diagram showing the function decode section of the input interface logic.
Figure 11:
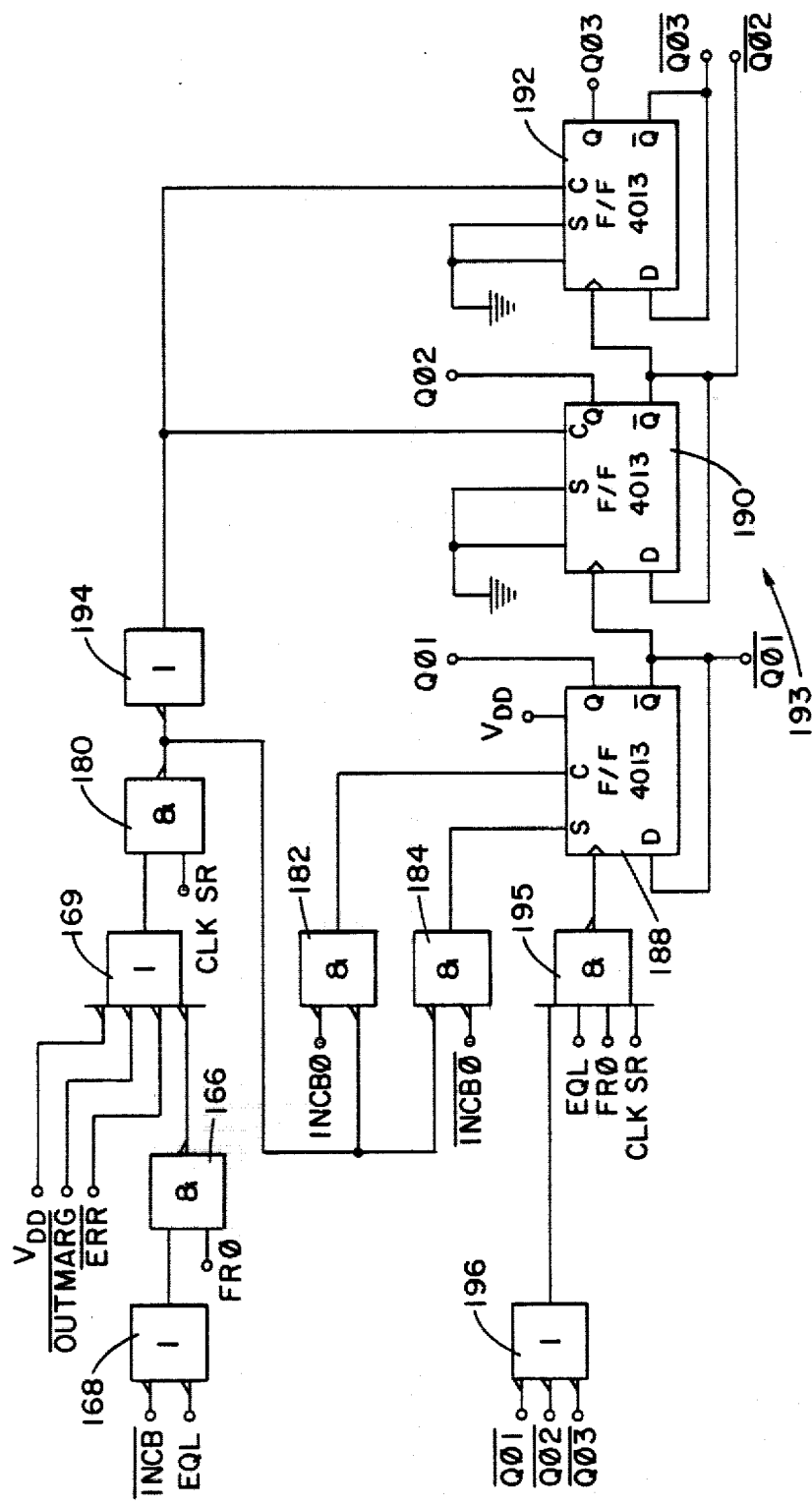
FIG. 11 is a diagram showing the frame φ state counter logic.
Figure 12:
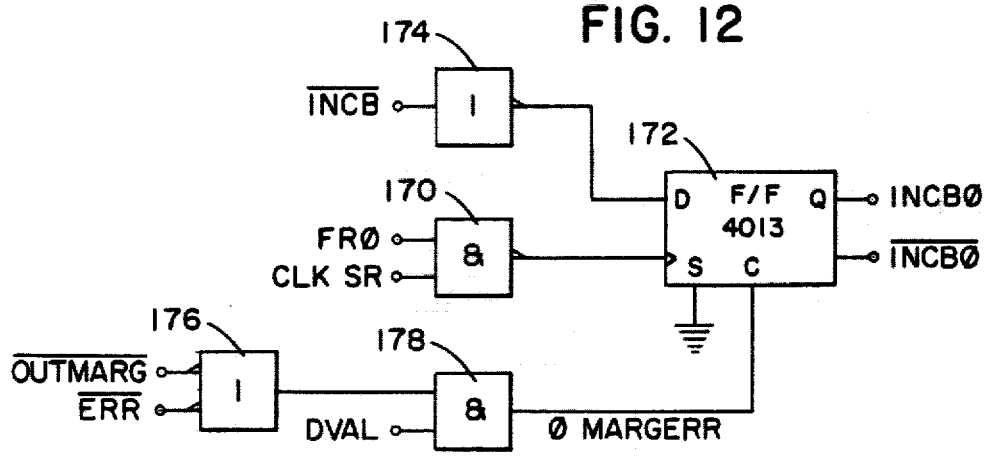
FIG. 12 is a diagram showing the INCBφ delay buffer logic.

As shown in FIG. 11, the output signal FRφ is applied to one input of a NAND gate 166. The signals $\overline{\text{INCB}}$, from flip-flop 164 (FIG. 10), and EQL, from flip-flop 149 (FIG. 8), are applied to the inverted inputs of an OR gate 168, whose output is connected to the second input of gate 166. The output of gate 166 is coupled to the inverted input of an OR gate 169, as are the signals $\overline{\text{ERR}}$ and $\overline{\text{OUTMARG}}$, from flip-flop 164 (FIG. 10). The output signal FRφ is also coupled with a signal CLK SR, a system clock, via a NAND gate 170 (FIG. 12). The output of gate 170 is a clock for a flip-flop 172. The input to flip-flop 172 is the signal INCB, which is generated by transmitting the signal $\overline{\text{INCB}}$ from flip-flop 164 (FIG. 10) through an inverter 174 (FIG. 12). The purpose of flip-flop 172 is to generate a four interval buffer of the INCB signal. The flip-flop 172 is cleared by the signals $\overline{\text{OURMARG}}$ and $\overline{\text{ERR}}$, both transmitted from flip-flop 164 (FIG. 10). These two signals are applied to the inverted inputs of an OR gate 174 whose output is coupled with the signal DVAL, a system clock, via an AND gate 178. The output signal φ MARGERR of gate 178 is connected to the master reset of flip-flop 172.

Referring again to FIG. 11, the output of OR gate 169 is coupled with the system clock signal CLK SR via a NAND gate 180, whose output signal is transmitted to an inverted input of AND gates 182 and 184. The signal INCBφ transmitted from flip-flop 172 (FIG. 12) is applied to the second inverted input of AND gate 182, while the inverted signal output $\overline{\text{INCB}\phi}$ of flip-flop 172 is applied to the second inverted input of gate 184. The output of gate 182 is connected to the master reset of a flip-flop 188, and is used to clear flip-flop 188. The output of gate 184 is connected to the master set of flip-flop 188 for setting the flip-flop in a manner that will now be described.

When the data from the pattern recognition array in the decoder chip 24 (FIG. 6) indicates that in center band is being scanned, the signal INCBφ will go low four clock pulses later, and the output of gate 184 will cause an eight bit binary counter 193, comprised of flip-flops 188, 190, and 192, to be set to 1. When flip-flop 188 is set to 1, flip-flops 190 and 192 are set to zero, since the output of gate 180 is inverted by a gate 194, and the output of gate 194 is connected to the master reset of flip-flops 190 and 192. Flip-flop 188, which is the least significant bit of the counter, is clocked by a four input NAND gate 195. Three of the inputs to gate 195 are signals EQL, from flip-flop 149 (FIG. 8), FRφ, from flip-flop 140 (FIG. 9), and CLK SR. The fourth input is connected to the output of an OR gate 196. The three inverted inputs of gate 196 are taken from the inverted outputs of flip-flops 188 (Qφ1), 190 (Qφ2), and 192 (Qφ3).

The signal appearing on the inverted output of flip-flop 188 is fed back to its input and is also connected to the clock input of flip-flop 190. The signal appearing on the inverted output of 190 is fed back to its input, and is also connected to the clock input of flip-flop 192. The signal appearing on the inverted output of flip-flop 192 is fed back to its input, allowing the flip-flops 188-192 inclusive to function as an eight bit binary counter.

In operation, the frame state counter FRφ 85(a) (FIGS. 7A and 11) is initially set to 1 by the output signal of gate 184 (FIG. 11) and is clocked by the system clock signal CLK SR via gate 195, each time the EQL and FRφ signals are present and the counter is not at zero. When the counter is counted up to 6, indicating that six characters have been stored in the FRφ shift registers 81a-81c inclusive (FIG. 7A), (or when the counter has counted to four in the case of a four character symbol), the frame state counter 85a signals the shift registers that a segment has been captured in a manner that will now be described.

Figure 13:
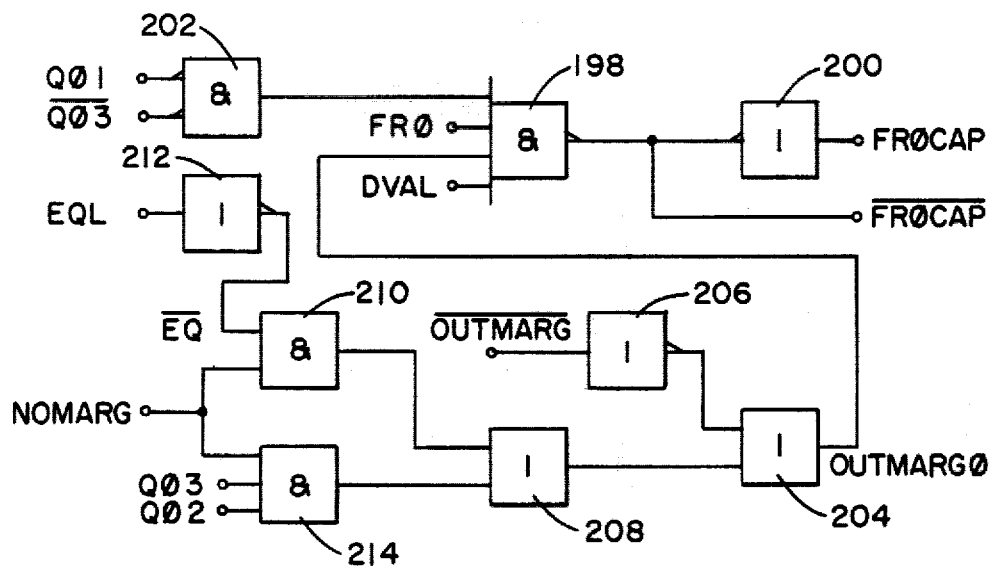
FIG. 13 is a diagram showing the frame φ capture logic.

Referring now to FIG. 13, the frame capture signal FRφCAP is generated by a four input NAND gate 198 whose output is inverted by a gate 200. The FRφ output signal of flip-flop 140 (FIG. 9) is connected to one input of gate 198, while the system clock signal DVAL, is connected to another input. A third input is connected to the output of an AND gate 202, on whose inverted inputs appear the signals Qφ1 from flip-flop 188 (FIG. 11), and $\overline{Q\phi3}$ from flip-flop 192 (FIG. 11). The fourth input to gate 198 is a signal OUTMARGφ, which is generated by a combination of several gates in the following manner. The signal OUTMARGφ appears on the output of an OR gate 204 which has applied to one of its inputs the signal OUTMARG, appearing on the output of an inverter 206, whose input signal $\overline{OUTMARG}$ is generated by flip-flop 164 (FIG. 10). The second input to gate 204 is connected to the output of a two input OR gate 208.

One input of gate 208 is enabled when a four character segment is read by the scanner, and the other input is enabled by a six character segment in a manner that will now be described. A two input AND gate 210 has inputs of $\overline{EQ}$, which is generated by the signal EQL from flip-flop 149 (FIG. 8) transmitted through an inverter 212, and the signal NOMARG, a microprocessor command. When a four character segment is scanned, EQ and NOMARG are both high, enabling AND gate 210. The output of AND gate 210 enables gates 208 and 204, causing the signal OUTMARGφ to go high.

An AND gate 214 has appearing on its inputs the signals NOMARG, a microprocessor command Qφ2 from flip-flop 190 (FIG. 11), and Qφ3 from flip-flop 192 (FIG. 11). When a six character segment is read, all three of these signals go high, enabling gates 214 (FIG. 13), 208, and 204, thereby causing OUTMARGφ to go high. The NORMARG command is used to capture data from a symbol which does not have margins. When the symbol being read contains margins, the data capture is controlled by the signal $\overline{OUTMARG}$ at gate 204. This signal goes low, causing OUTMARGφ, from gate 204, to go high. When the eight bit binary counter 193 shown in FIG. 11 is counted to either 4 or 6, the output signals Qφ1 and $\overline{Q\phi3}$ are both low, enabling gate 202 (FIG. 13). Since the OUTMARGφ signal goes high and FRφ is also high, the system clock signal DVAL toggles gate 198, causing FRφCAP to go high. This signal is used by the shift registers 81a-81c inclusive (FIG. 7A) to capture the valid data.

Figure 14:
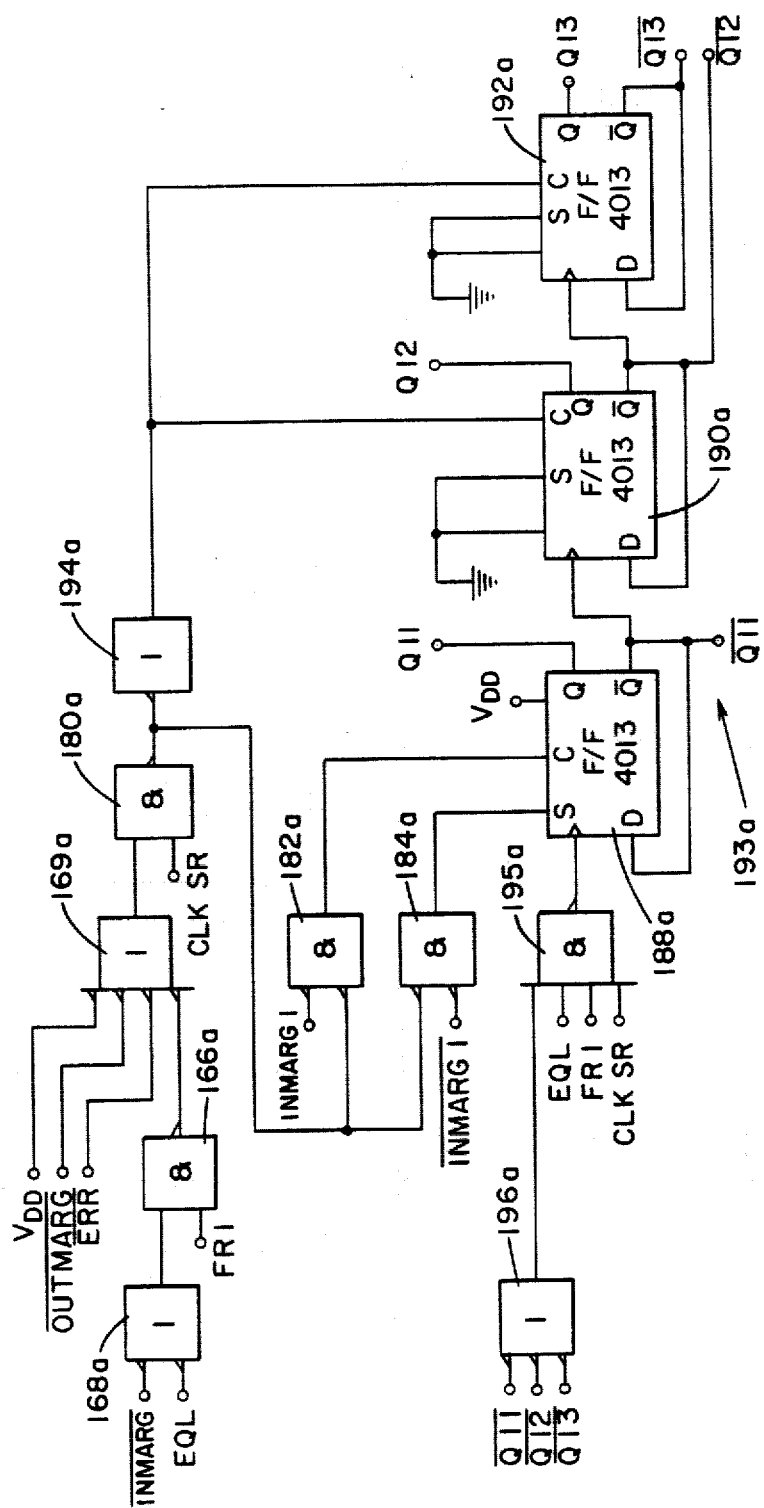
FIG. 14 is a diagram showing the frame 1 state counter logic.
Figure 15:
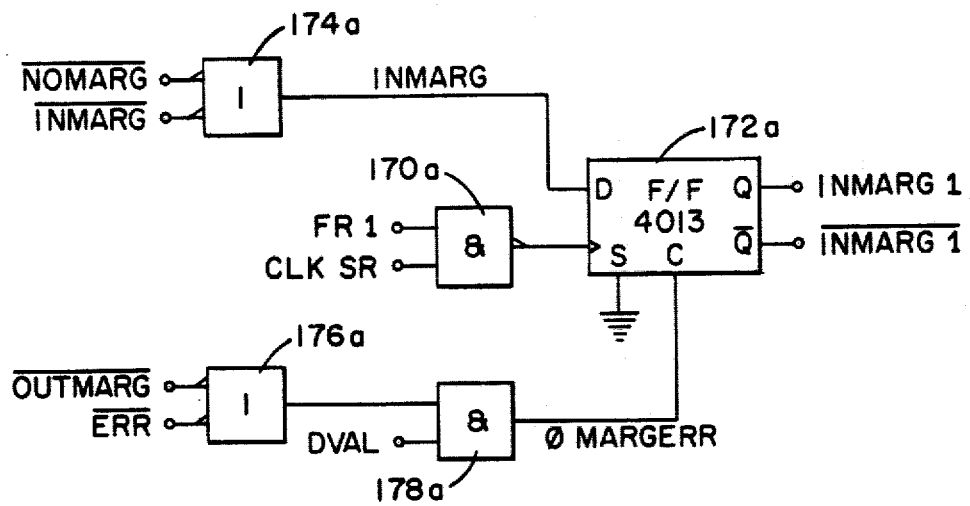
FIG. 15 is a diagram showing the INMARG1 dalay buffer logic.

Referring now to FIG. 14, there is shown the logic associated with the frame 1 state counter 85(b) (FIG. 7A) in which the signal FR1 from the flip-flop 140 (FIG. 9) is applied to the frame state counter at an input to a NAND gate 166a. The signals $\overline{INMARG}$, transmitted from flip-flop 164 (FIG. 10), and EQL, transmitted from flip-flop 149 (FIG. 8), are applied to the inverted inputs of an OR gate 168a. whose output is connected to the second input of gate 166a. The output of 166a is connected to an inverted input of an OR gate 169a, as do the signals $\overline{ERR}$ and $\overline{OUTMARG}$, from flip-flop 164 (FIG. 10). The signal FR1 is also coupled with the system clock CLK SR via a NAND gate 170a (FIG. 15). The output of gate 170a is a clock input for a flip-flop 172a, whose other input is the signal IN MARG, which is generated by transmitting signals $\overline{INMARG}$ and $\overline{NOMARG}$ to the inverted inputs of an OR gate 174a. The purpose of flip-flop 172a is to generate a four interval buffer of the INMARG signal. Flip-flop 172a is cleared by the signal φMARGERR from AND gate 178a via an OR gate 176a.

Referring to FIG. 14, the output of OR gate 169a is coupled with the system clock signal CLKSR via a NAND gate 180a, whose output signal is transmitted to an inverted input of AND gates 182a and 184a. The signal INMARG1 transmitted from flip-flop 172a (FIG. 15) is applied to the second inverted input of gate 182a, together with the signal $\overline{INMARG1}$ (FIG. 15) being applied to the second inverted input of gate 184a. The output of gate 182a is connected to the master reset of the flip-flop 188a, and is used to clear the flip-flop 188a. The output of gate 184a is connected to the master set of flip-flop 188a. When the data from the pattern recognition array in the decoder chip 24 indicates that an in margin is being scanned, the signal $\overline{IMMARG1}$ will go low four clock pulses later, and the output of 184a will cause an eight bit binary counter 193a comprised of flip-flops 188a, 190a, and 192a, to be set to 1. When flip-flop 188a is set to 1, flip-flops 190a and 192a are set to zero, since the output of gate 180a is inverted by a gate 194a, and the output of 194a is connected to the master reset of flip-flops 190a and 192a.

Flip-flop 188a, which is the least significant bit of the counter, is clocked by a four input NAND gate 195a. Appearing on three of the inputs to gate 195a are the signals EQL from flip-flop 149 (FIG. 8), FR1, from flip-flop 140 (FIG. 9), and the system clock CLK SR. The fourth input is connected to the output of an OR gate 196a. The three inverted inputs of gates 196a are taken from the inverted outputs of flip-flops 188a $(\overline{Q11})$, 190a, $(\overline{Q12})$, and 192a $(\overline{Q13})$. As shown in FIG. 14, the signal appearing on the inverted output of flip-flop 188a is fed back to the input and is also connected to the clock input of flip-flop 190a. The signal appearing on the inverted output of 190a is fed back to the input, and is also connected to the clock input of flip-flop 192a. The signal appearing on the inverted output of flip-flop 192a is fed back to its input.

In operation, the frame state counter FR1 85(b) (FIG. 7A) is initially set to 1 and is clocked by the CLK SR signal via gate 195a each time the EQL and FR1 signals are present and the counter is not at zero. When the counter has counted up to 6, indicating that six characters have been stored in the FR1 shift registers 82a-82c (FIG. 7A) (or when the counter has counted to 4 in the case of a four character symbol) the frame state counter 85(b) signals the shift registers that a segment has been captured.

Figure 16:
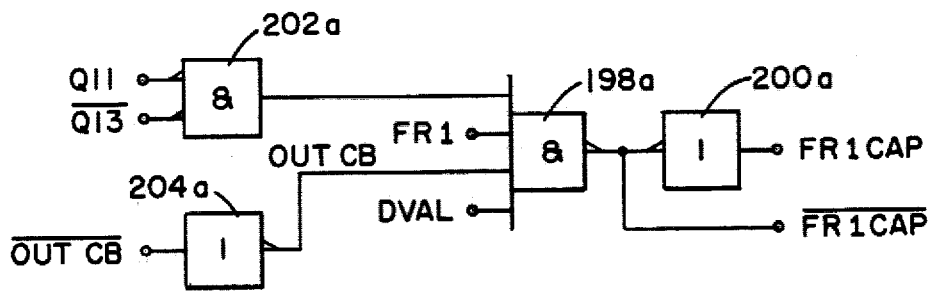
FIG. 16 is a diagram showing the frame 1 capture logic.

Referring now to FIG. 16, the frame capture signal FR1CAP is generated by a four input NAND gate 198a whose output is inverted by an inverter 200a. The FR1 signal is connected to one input of gate 198a, and the system clock signal DVAL is connected to another input. A third input to the gate 198a is connected to the output of an AND gate 202a, whose inverted inputs are connected to Q11 transmitted from flip-flop 188a (FIG. 14), and to $\overline{Q13}$ from flip-flop 192a (FIG. 14). The fourth input to gate 198a is the signal $\overline{OUTCB}$, which is the output of an inverter 204a, whose input OUTCB is generated by flip-flop 164 (FIG. 10). When the eight bit binary counter 193a (FIG. 14) is counted to either 4 or 6, the output signals Q11 and $\overline{Q13}$ are both low, enabling gate 202a (FIG. 16). When an OUTCB signal is present along with signal FR1, the system clock signal DVAL toggles gate 198a, causing the signal FR1CAP to go high. This signal is used by the shift registers 82a–82c (FIG. 7A) to capture the valid data.

Referring now to FIG. 7A, there will be described the operation of the shift register in capturing the valid data being outputted from the pattern recognition array located in the decoder chip 24 (FIG. 6). As shown in FIG. 8, the outputs of flip-flop 102 which comprise the hexadecimal bits $2^0$–$2^3$, and the parity bit P transmitted through a line driver 220 to flip-flop 149. The outputs of flip-flop 149 are connected to the input of each of the twelve shift registers 81a–c, 82a–c, 83a–c, and 84a–c (FIG. 7A). The twelve shift registers are divided into four groups, with three shift registers associated with each frame state counter 85a–85d. For ease of explanation, the operation of only one shift register will be discussed, it being understood that such operation is similar in the other shift registers.

Figure 17A:
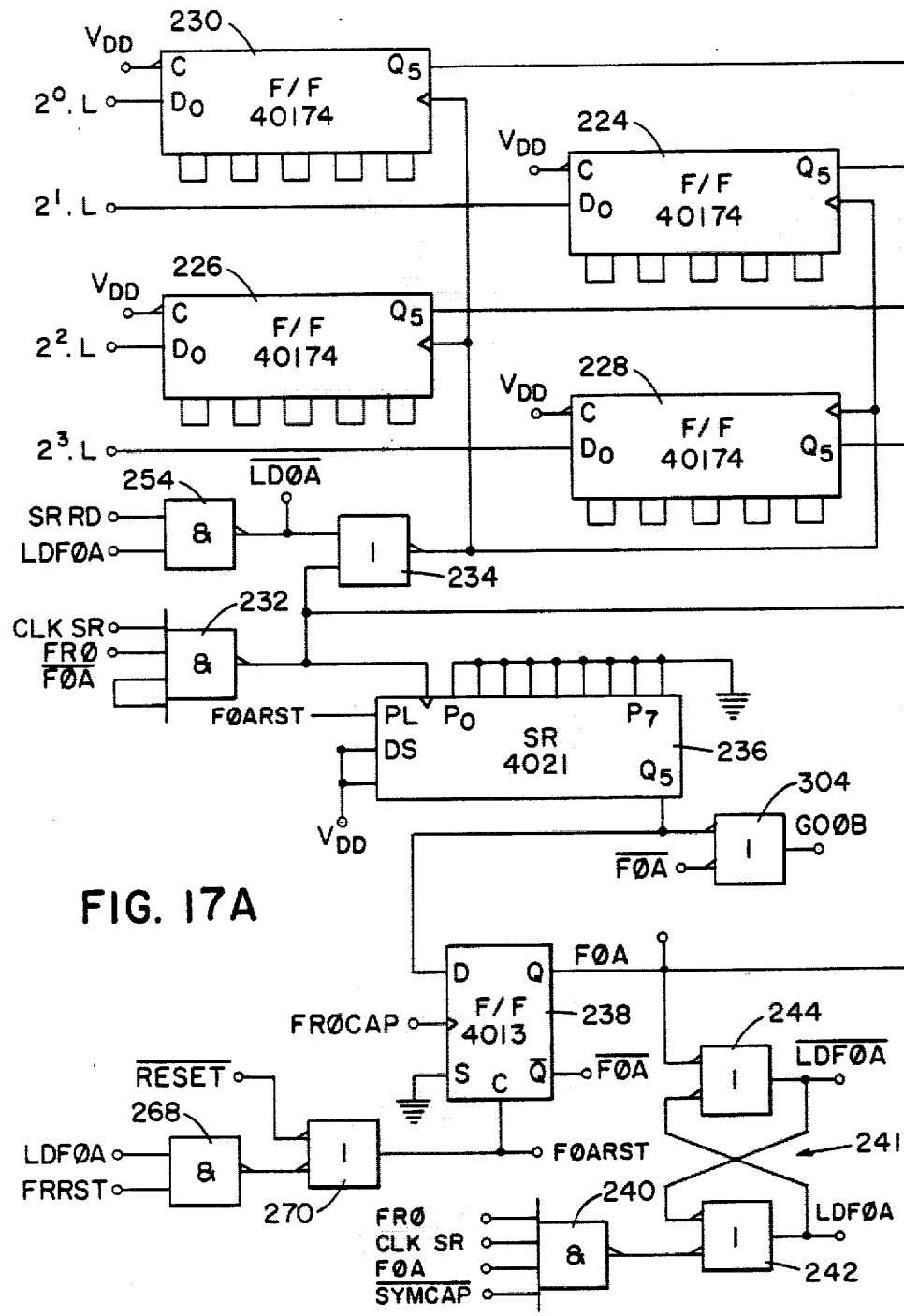
FIGS. 17A and 17B taken together show the FφA shift register logic.
Figure 17B:
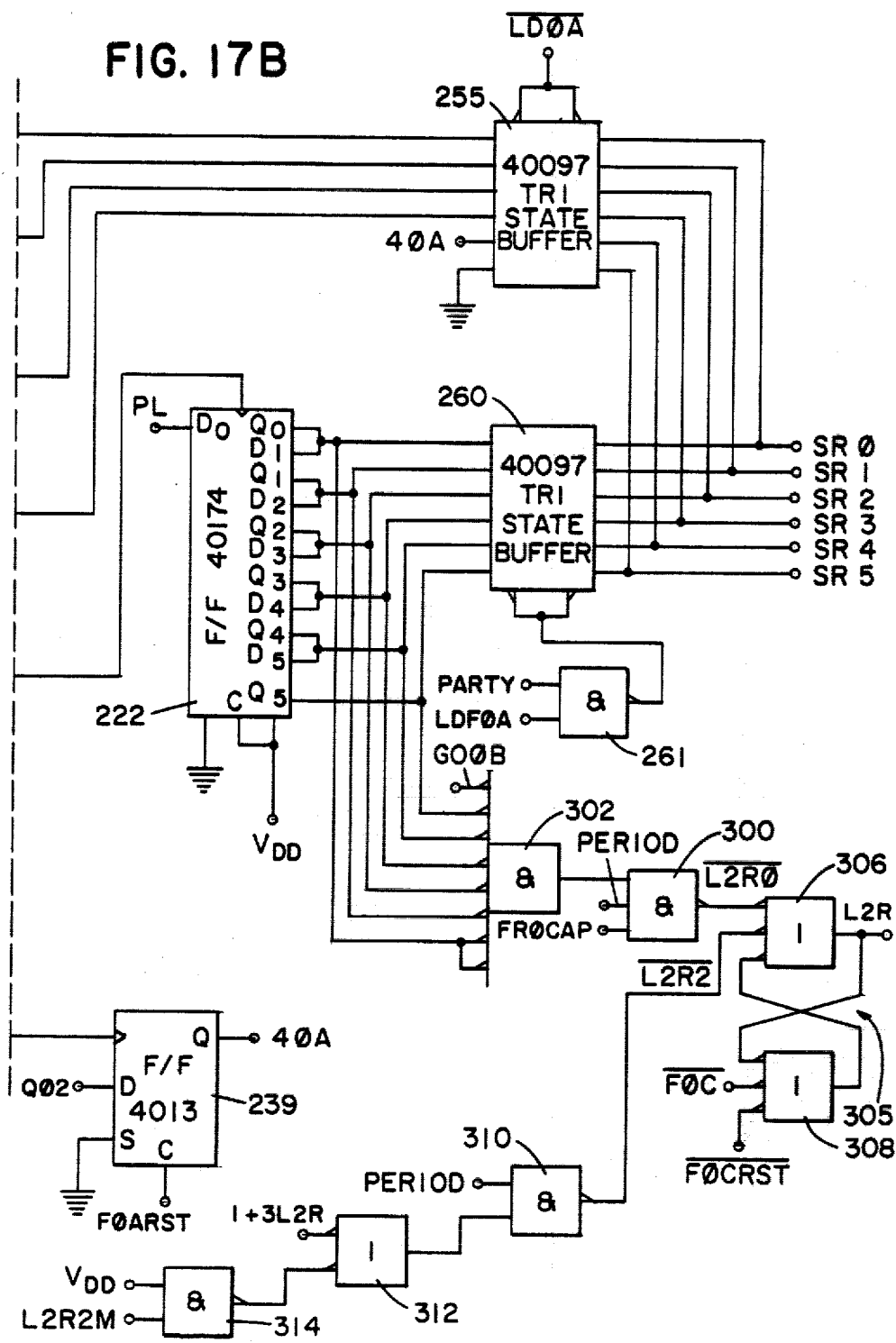

The circuit configuration of shift register 81a is shown in FIGS. 17A and 17B. Each shift register is a 5×6 bit shift register composed of five 1×6 flip-flops 222–230. Each hexadecimal bit of the data plus the PARITY bit is inputted into one of the flip-flops. The data is clocked into the flip-flops via a NAND gate 232. The inputs to gate 232 are the signal FR$\phi$, from flip-flop 140 (FIG. 9), which is high during frame $\phi$, the signal $\overline{F\phi A}$, which is initially high, and the system clock signal CLK SR. The data is clocked into the PARITY shift register 222 as the signal CLK SR toggles, while the hexadecimal data is clocked into the flip-flops 224–230 via a NOR gate 234. The NAND gate 232 also clocks a shift register 236 (FIG. 17A). The output of shift register 236 is connected to the input of a flip-flop 238 which is clocked by the signal FR$\phi$CAP transmitted from gate 200 (FIG. 13). In operation, when the sixth character is clocked into the flip-flops 222–230, the output of shift register 236 goes high. This output is transmitted to the input of flip-flop 238, and is clocked into the flip-flop, since the signal FR$\phi$CAP goes high when a segment is captured. The Q output signal F$\phi$A of flip-flop 238 goes high, while the $\overline{Q}$ output, $\overline{F\phi A}$, goes low, thereby disabling gate 232, and removing the clocking signal from flip-flops 222–230.

The output signal F$\phi$A of flip-flop 238 is also used to clock a flip-flop 239 (FIG. 17B). When the segment captured by the shift register is a four character segment, the input signal $\overline{Q\phi 2}$ to flip-flop 239 goes high. When the other input signal F$\phi$A to the flip-flop 239 goes high, the output signal 4$\phi$A of flip-flop 239 also goes high. This output signal is used to tell the microprocessor that the segment captured is a four character segment.

The output signal F$\phi$A is also inputted to a four input NAND gate 240 (FIG. 17A). Another input to gate 240 is the signal $\overline{SYMCAP}$, which comprises the load signals from all twelve shift registers and goes to a low level if data is captured in any one of the shift registers. The third input signal, FR$\phi$, is high during frame $\phi$, and the fourth input signal, CLK SR, is the system clock signal. When a segment is captured in the shift register, the output of gate 240 will enable the inverted input of an OR gate 242 (FIG. 17A) which, together with OR gate 244, forms a latch.

The output signal LDF$\phi$A of gate 242, when going high, enables a NOR gate 246 (FIG. 18), and also a NOR gate 247 with inverted inputs, causing the output signal $\overline{SYMCAP}$ of gate 247 to go low. Signals similar to LDF$\phi$A transmitted from shift registers 81b and 81c (FIG. 7A) are also inputted to gate 246. Similar signals from shift registers 82a–c, 83a–c, and 84a–c are transmitted to gate 247 via NOR gates 248 and 249. The output signal $\overline{SYMCAP}$ is transmitted through a gate 250 directly to the microprocessor 30 (FIG. 6) as an interrupt, alerting it that a valid data segment has been captured.

The output signals of gates 246 and 249 are also transmitted to the input of a NAND gate 251, as shown in FIG. 19. The output of gate 251 is connected to an inverted input of an OR gate 252. The other input to gate 252 is normally high, and goes low only during the capture of periodical data. The output of gate 252 is connected to an input of a tri-state buffer 253. When the load signal of one of the shift registers, such as LDF$\phi$A, goes high, the output of gate 251 goes high, causing the input to buffer 253 to go low. When the microprocessor 30 (FIG. 6) is ready to read the shift register, it generates a clocking signal $\overline{SR\ RD}$ (the generation of the microprocessor command signals is described later). The signal $\overline{SR\ RD}$ goes low, enabling buffer 253 and causing the output line SR6 of the SR data bus to go low. This signal aids the microprocessor in determining the type of segment which is captured in the shift register.

Referring again to FIG. 17A, the signal $\overline{SR\ RD}$ generated by the microprocessor 30 (FIG. 6) is transmitted to one input of a NAND gate 254. Appearing on the other input to gate 254 is the signal LDF$\phi$A, transmitted from gate 242. Appearing on the output of gate 254 is the signal $\overline{LD\phi A}$, which enables a tri-state buffer 255 to load the data from flip-flops 224–230 onto the SR data bus. The signal $\overline{SR\ RD}$ also toggles gates 254 and 234 until it has clocked out the stored characters in parallel from flip-flops 224–230 over the SR bus and through the level converters 256 and 257 and the tri-state driver 258 (FIG. 24B) to the microprocessor. The signal $\overline{SR\ RD}$ from the microprocessor is used to clock data into a flip-flop 259 (FIG. 20) from the data lines SR4 and SR5, this data being used by the microprocessor in interpreting the type of symbol read.

The parity bits P of the segment captured in the flip-flop 222 can be read by the microprocessor at this time. At this time, the flip-flop 222 has outputted all six bits in parallel to a tri-state buffer 260. The buffer 260 is controlled by a NAND gate 261, which is enabled by the signals LDF$\phi$A and PARTY transmitted from the OR gate 242 (FIG. 17A) and the microprocessor 30 (FIG. 6) respectively. Since the signal LDF$\phi$A is already high, PARTY, which is a microprocessor controlled signal, must go high to transmit the data, over lines SR$\phi$-5, onto the SR bus. When the microprocessor 30 is ready to read the parity data, it sends a command which is decoded by the command decode array 90 (FIG. 7B), transmitting the PARTY signal to gate 261 and also to an inverting gate 263, which is shown in FIG. 20.

Figure 20:
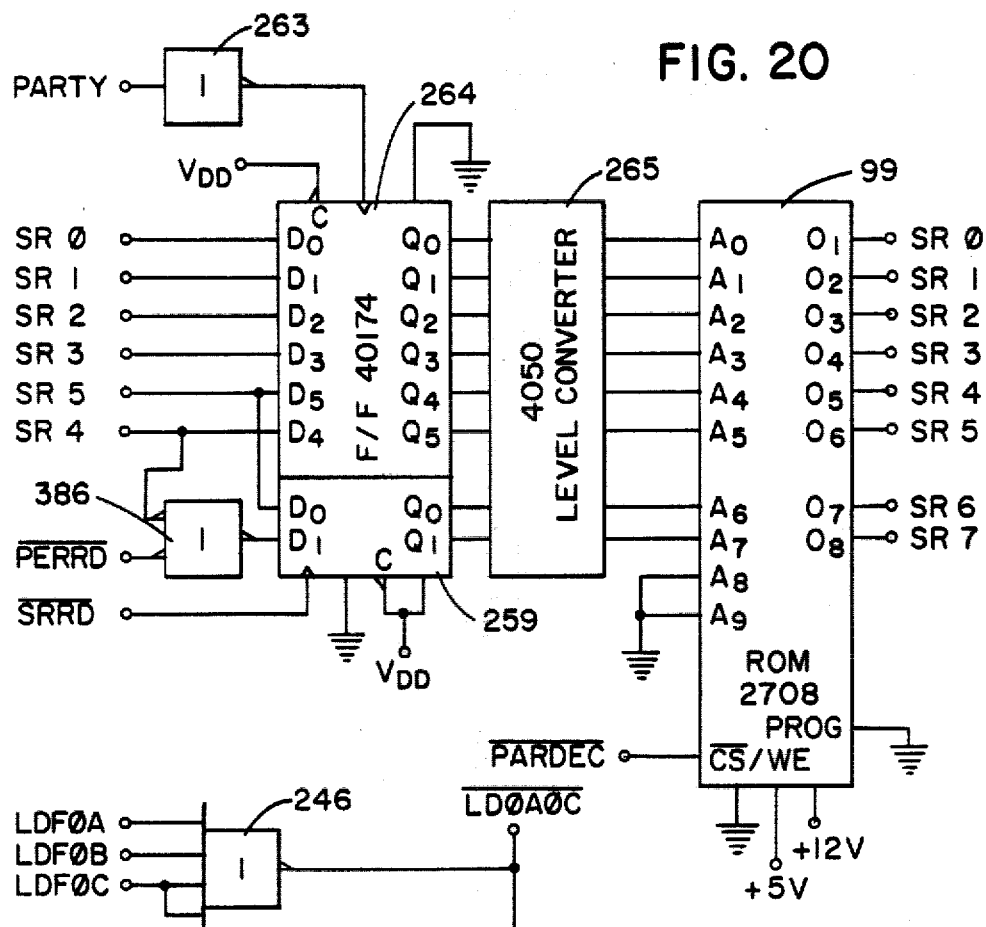
FIG. 20 is a diagram showing the logic circuit for the ROM which interprets the parity data of a segment.

Referring to FIG. 20, the data appearing on lines SR$\phi$–SR5 inclusive is latched into a flip-flop 264 and the signals converted by a level converter 265, enabling the signals to address a ROM 99. The signal $\overline{PARDEC}$, which is another microprocessor based command, controls the chip select input to the ROM. When it is activated, it causes the address corresponding to the parity data to read out from the ROM 99 data to the microprocessor which indicates whether the segment read from the symbol is a left or a right half, whether it is from one of a number of different type symbols or a symbol located on a periodical, and whether it was read forward or backward. This method of decoding saves approximately 200-300 bytes of ROM in the microprocessor, in addition to saving time.

Figure 18:
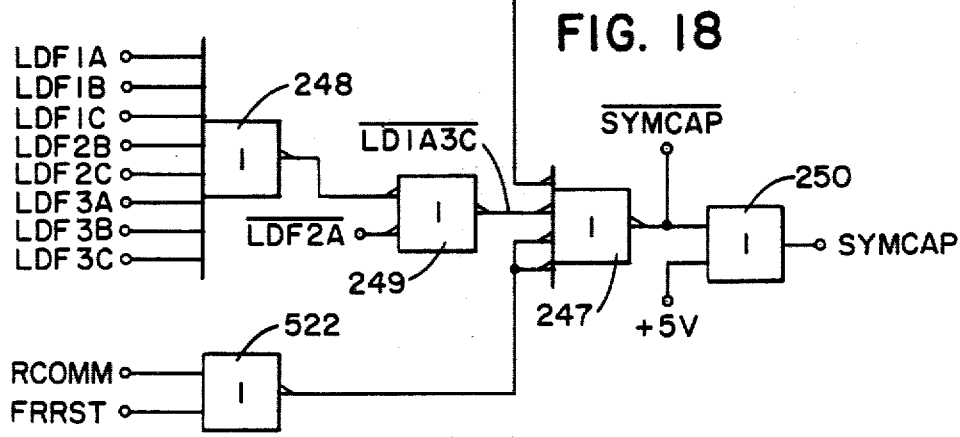
FIG. 18 is a diagram showing the logic circuit for altering the microprocessor that a segment has been captured.

Referring again to FIG. 17A, after the six characters and the parity data have been read into the microprocessor, a frame reset occurs in the following manner. A signal FR RST is generated by the microprocessor 30 (FIG. 6) and sent to a NAND gate 268, which receives the signal LDF$\phi$A from the OR gate 242 at another input. When the signal LDF$\phi$A is high, the signal FR RST enables gate 268 and also an inverted input to an OR gate 270. The output signal F$\phi$ARST of gate 270, is connected to the master reset of flip-flop 238 and 239, causing the output signal F$\phi$A to go low, and also enabling the output signal $\overline{\text{LDF}\phi\text{A}}$ of gate 244 to go high. This, in turn, allows the signal $\overline{\text{SYMCAP}}$ to return to its high state, via gates 246 and 247 (FIG. 18). With the signal $\overline{\text{SYMCAP}}$ high, the microprocessor is now able to read another shift register which has captured a valid segment. The signal F$\phi$ARST is also connected to the parallel load input to shift register 236, allowing it to begin a new count.

Figure 30:
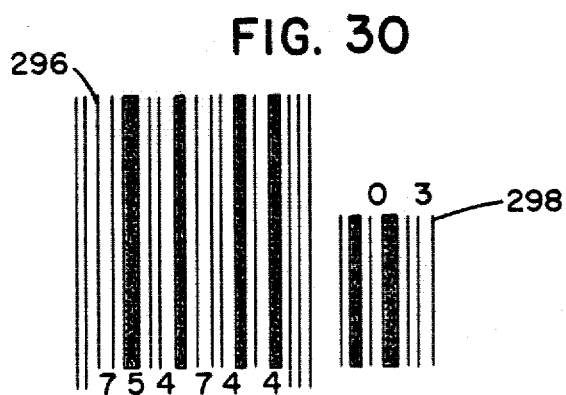
FIG. 30 is a geographical representation of a barcode multi symbol, such as found on periodicals.

The reading of a UPC multi-symbol, such as occurs on a periodical, is accomplished in a similar manner to the reading of the other symbols. A UPC multi-symbol such as the type found on periodicals is shown in FIG. 30. The first symbol 296 can be of the type shown in FIG. 1. Following the first symbol is a six module wide blank space. The second symbol 298, smaller than the first, follows the blank area. This symbol begins with a bar one module wide, then a space one module wide, and next a bar two modules wide. Following this, there may be either two or five characters. The multi-symbol or periodical symbol is scanned in the same manner as a regular UPC symbol.

The capture of a periodical symbol is done only the the F$\phi$C shift register 81(c) (FIG. 7A). The periodical latch, as will be described more fully hereinafter, is set by a command from the microprocessor. The output signal, PERIOD, generated by the latch is transmitted to a NAND gate 300 (FIG. 17B). The signal FR$\phi$CAP (FIG. 13) is also transmitted to gate 300. The third input to gate 300 is connected to the output of an AND gate 302. The six bits of data from flip-flop 222 (FIG. 17B) and the signal GO$\phi$B (FIG. 17A) from an OR gate 304 are all transmitted to the inverted inputs of gate 302. When the scanner is scanning the area between the two symbols on a periodical, the output of gate 302 will go high. The signals PERIOD and FR$\phi$CAP are also high, causing the output of gate 300 to go low. This output signal $\overline{\text{L2R}\phi}$, is connected to a latch, 305, formed by OR gates 306 and 308 (FIG. 17B). When the signal $\overline{\text{L2R0}}$ goes low, latch 305 sets, and the output signal L2R of gate 306, goes high.

Another input to gate 306 of the latch 305 is the signal $\overline{\text{L2R2}}$. This signal is the equivalent of $\overline{\text{L2R}\phi}$, except that it is generated at frame 2 rather than frame $\phi$. $\overline{\text{L2R2}}$ is generated by a NAND gate 310. One input to the gate 310 is the signal PERIOD, and the other input is generated by an OR gate 312 via a NAND gate 314, using signals generated by frame 2 (not shown).

Referring to FIG. 21, there is shown the signals L2R and PERIOD being transmitted to a NAND gate 320. The signal $\overline{\text{START P}}$, transmitted from the inverted output of a flip-flop 322, is also inputted to gate 320. When the scanner is in the area between the two tags during the scanning of a periodical label, all of these signals are high, enabling the system clock signal, CLK1, to toggle gate 320 thereby clocking the flip-flop 322. The data input to flip-flop 322 is the signal $\overline{\text{F}\phi\text{C}}$, 322, which is high when no data is captured in the F$\phi$C shift register 81c (FIG. 7). When the flip-flop 322 is clocked by gate 320, the output signal START P, goes high, and $\overline{\text{START P}}$, the inverted output goes low, disabling gate 320. The signal START P is transmitted to the data input of a shift register 324 which is clocked into the shift register 324 by the system clock signal CLK1. After six CLK1 clock pulses, the Q$_5$ output of shift register 324 goes high, which signal is transmitted to the master set input of a flip-flop 326, causing the output signal LOAD P of flip-flop 326, LOAD P, to go high. The high signal LOAD P is then transmitted to a NAND gate 328, where it is combined with the system clock signal DVAL. The output of gate 328 is connected to an inverted input of an OR gate 330 on whose other input will appear a signal $\overline{\text{F}\phi\text{CRST}}$, which is the reset signal for the F$\phi$C shift register 81c. The signal $\overline{\text{F}\phi\text{CRST}}$ is similar to the reset signal F$\phi$ARST shown in FIG. 17A). The output signal of gate 330 is inverted by a gate 332, and then transmitted to the master reset input of shift register 324.

In operation, as long as signal START P is present, the flip-flop 324 will produce an output at Q$_5$ after six pulses of CLK1, generating the signal LOAD P from flip-flop 326, which clears flip-flop 324 via gates 328, 330 and 332. This operation will cycle continuously until flip-flop 322, which generates START P, is cleared by a signal transmitted through an OR gate 334 and a NAND gate 336. The input signals to gate 336 are PER, a signal generated by the flip-flop 338, and the logic voltage supply V$_{DD}$. The output of gate 336 is connected to an inverted input to gate 334. The other input to gate 334 is $\overline{\text{F}\phi\text{CRST}}$. The output of gate 334 is connected to the master reset input to flip-flop 322.

The Q$_1$ output of flip-flop 324 is connected to a NAND gate 340, while the Q$_2$ output is connected to an inverted input of an AND gate 342. The other inverted input to gate 342 is connected to the Q$_0$ output of flip-flop 338. In operation, after receiving the second clock pulse CLK1, the Q$_1$ output from flip-flop 324 will be high, and the Q$_2$ output low. The Q$_0$ output from flip-flop 338 is also low at this time, enabling gate 342, whose output signal enables gate 340, since Q$_1$ of flip-flop 324 is also high at this time. The output signal of gate 340 is inverted by the inverter 342 to generate a signal 1ST which is high for only one clock pulse of CLK1, since the next clock pulse causes Q$_2$ of flip-flop 324 to go high, disabling gates 342 and 340.

Figure 22:
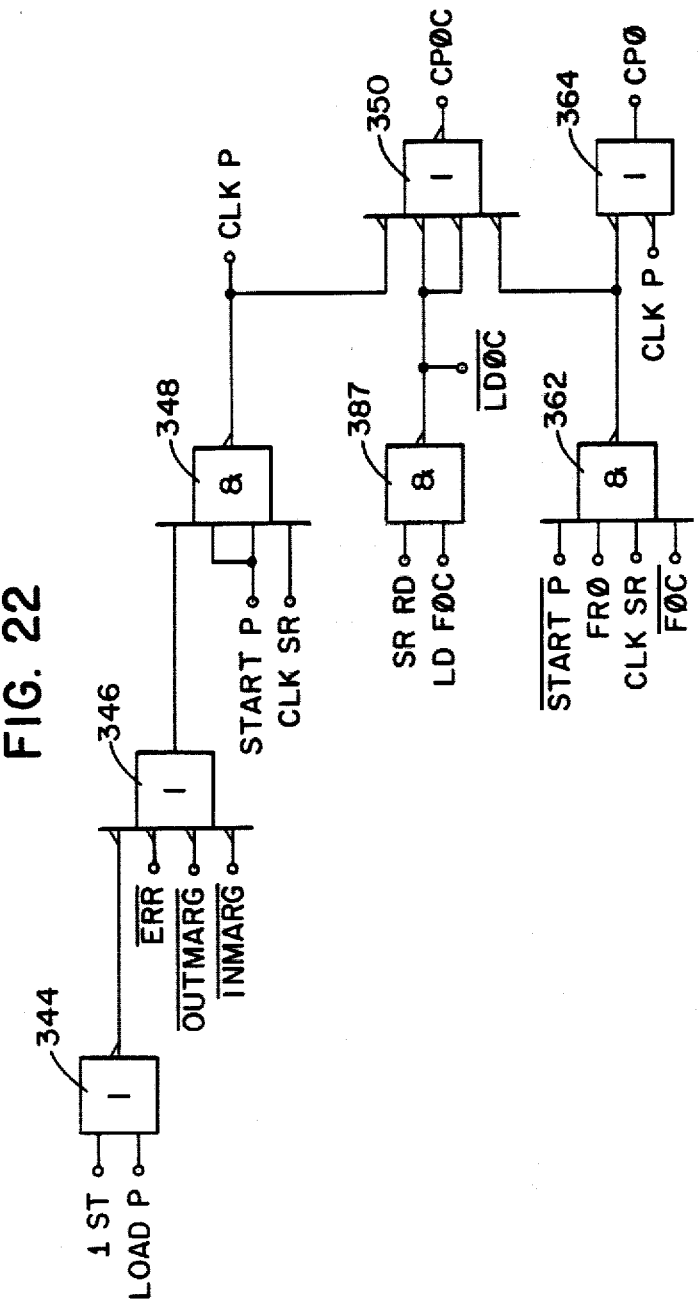
FIG. 22 is a diagram showing the logic circuitry associated with clocking the periodical data.

The signal 1ST is transmitted to the input of a NOR gate 344 (FIG. 22). The other input to gate 344 is LOAD P transmitted from flip-flop 326 (FIG. 21). The output of gate 344 is connected to an inverted input of a four input OR gate 346, on whose other three inputs appear the signals, $\overline{\text{ERR}}$, $\overline{\text{OUTMARG}}$, and $\overline{\text{INMARG}}$, from flip-flop 164 (FIG. 10). The output of gate 346 is connected to one input of a NAND gate 348 on whose other inputs appear the signals $\overline{\text{START P}}$, from flip-flop 322 (FIG. 21), and the system clock signal CLK SR. The output of gate 348 is the signal CLK P, which is used to clock the shift register 338 (FIG. 21). When the signal 1ST pulses, it enables gates 344 and 346, which allows the signal CLK SR to toggle gate 348, thereby generating the CLK P signal which in turn causes the shift register 338 to activate. After the 1ST signal is removed, CLK P can be generated by the LOAD P signal, or by the ERR, OUTMARG, or INMARG signals.

Referring again to FIG. 21, it will be seen that when the signal CLK P has pulsed six times, the $Q_5$ output signal PER of shift register 338, goes high. The signal PER is transmitted to gate 336 (FIG. 21), which causes the flip-flop 322 to clear, disabling CLK P (FIG. 22) in the manner described previously.

The signal CLK P is transmitted to an inverted input of a NOR gate 350 (FIG. 22), the output of which is the signal CP$\phi$C, used to clock the periodical data into the flip-flop 352-358 (FIG. 23A) via an inverter 360. The signal CP$\phi$C can also be clocked for normal operation by a NAND gate 362, the operation of which is similar to gate 240 of FIG. 17A. The signal CLK P is also transmitted to an OR gate 364 (FIG. 22), the output of which is the signal CP$\phi$, used to clock the parity data from the periodical symbol into a shift register 366 (FIG. 23B). The signal CP$\phi$ is also used to clock shift register 368 (FIG. 23A) in normal operation, the operation of which is similar to shift register 236 of FIG. 17A. The signal CLK P (FIG. 22) can also be generated by the output of gate 362, which operation is similar to gate 232 of FIG. 17A.

Figure 23A:
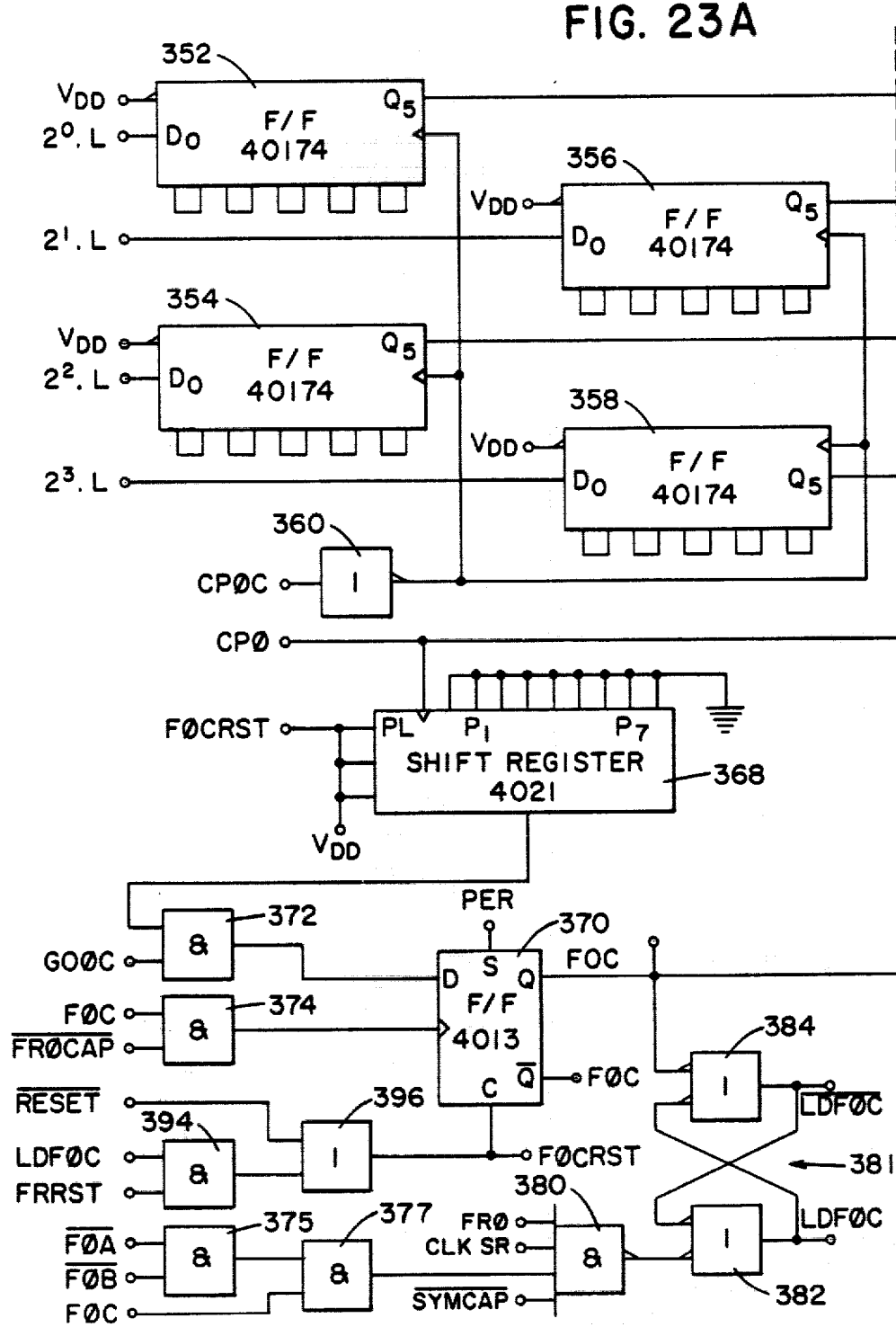
FIGS. 23A and 23B taken together show the FφC shift register logic.
Figure 23B:
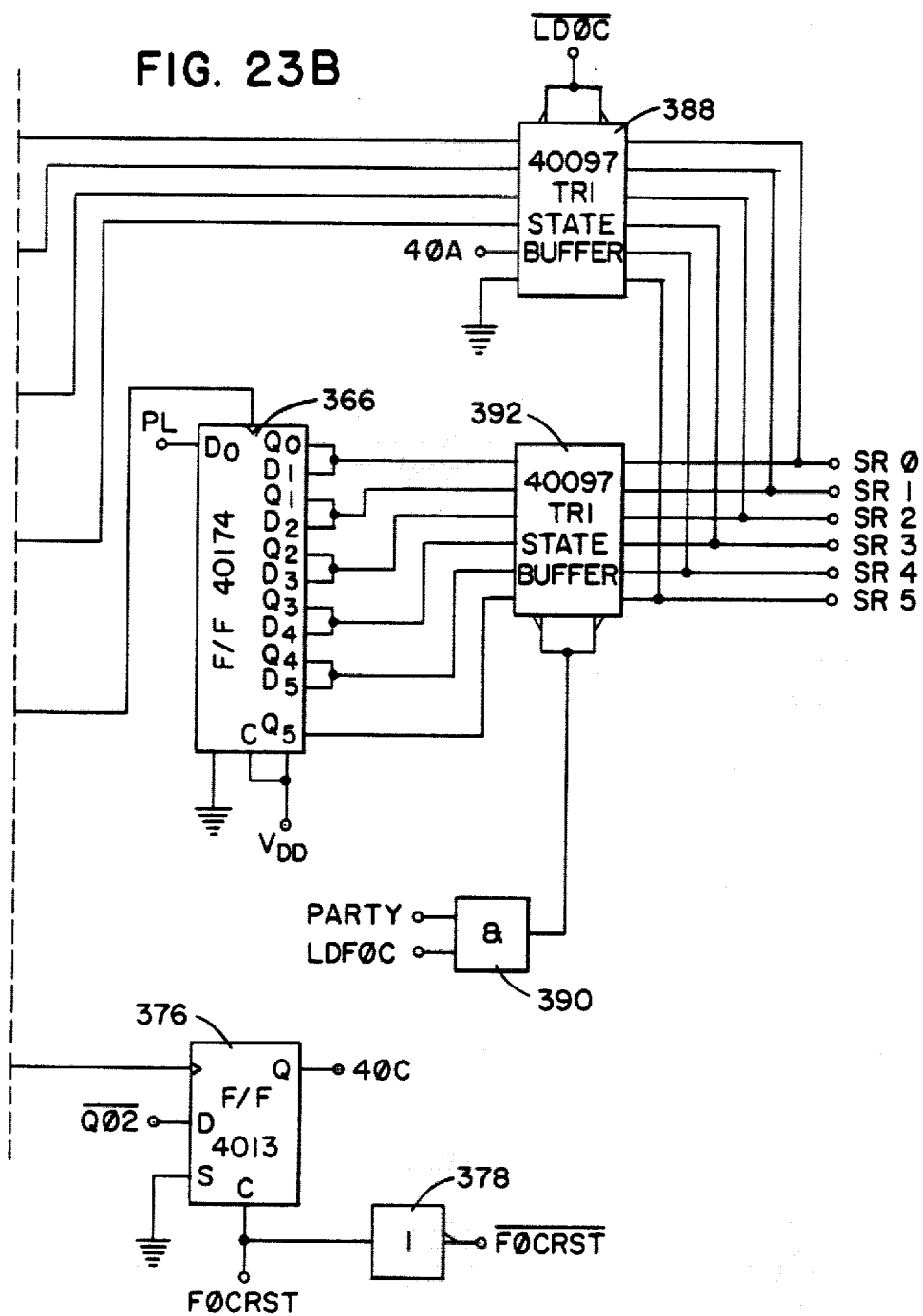

Referring to FIG. 23A and 23B, the signal PER is also transmitted to the master set input of a flip-flop 370 (FIG. 23A). When the signal PER goes high, the output signal F$\phi$C of flip-flop 370, also goes high. The AND gates 372 and 374 are used to set flip-flop 370 during normal operation while the signal F$\phi$C is connected to a flip-flop 376 (FIG. 23B), used to designate a four character capture in normal operation, and which operates in a similar manner to flip-flop 239 of FIG. 17B. The gate 378 is an inverter which is used to reset flip-flop 376. The signal F$\phi$C is also transmitted to an AND gate 377 (FIG. 23A) whose other input is taken from the output of an AND gate 377, which has signals $\overline{F\phi A}$ and $\overline{F\phi B}$ appearing at its inputs. When the F$\phi$C register 81(c) (FIG. 7A) has captured some data, the output signal of gate 377 goes high which is transmitted to a NAND gate 380 on whose other inputs include the signal FR$\phi$ and $\overline{SYMCAP}$ which when high allow the input clock signal CLK SR to toggle gate 380, causing a latch 381 formed by OR gates 382 and 384 to be set. The output signal LDF$\phi$C of gate 382, also goes high, which causes the $\overline{SYMCAP}$ signal to go low via gates 246 and 247 (FIG. 18), signalling the microprocessor that a segment has been captured.

The signal LDF$\phi$C (FIG. 23A) is also transmitted to a NAND gate 385 (FIG. 19), where it is combined with the PER signal (FIG. 21) to generate the signal $\overline{PERRD}$ which enables gate 252, and causes the SR6 line to go high when buffer 253 is clocked by the microprocessor generated signal $\overline{SR\ RD}$, and thus aids the microprocessor in interpreting the type of symbol being read. The signal $\overline{PERRD}$ is also transmitted to an OR gate 386 (FIG. 20). Since the signal $\overline{PERRD}$ is low at this time, it causes the $D_1$ input of flip-flop 259 to go low, and it is clocked into flip-flop 259 by $\overline{SR\ RD}$, also helping the microprocessor in interpreting the type of symbol being read.

Referring now to FIG. 22, the microprocessor 30 (FIG. 6) will generate the SR RD signal when it is ready to receive the data segment, sending that signal to a NAND gate 387. The load output signal $\overline{LD\phi C}$ of gate 387, going low, enables a tri-state buffer 388 (FIG. 23B) to load the data onto the SR data bus, and also causes CP$\phi$C to clock the data from flip-flops 352-358 to buffer 388. The microprocessor then clocks the parity data onto the SR data bus by generating the PARTY signal, which is combined with the signal LDF$\phi$C (FIG. 23A) at an AND gate 390 whose output signal enables a tri-state buffer 392 (FIG. 23B) to load the parity data onto the SR bus comprising the bus lines SR0-SR5 inclusive.

The F$\phi$C register 81(c) (FIG. 7A) is reset when the microprocessor generates the FR RST signal, causing flip-flop 370 (FIG. 23A) to clear via an AND gate 394 and an OR gate 396. The clearing of flip-flop 370 causes the LDF$\phi$C latch 381 to clear, allowing $\overline{SYMCAP}$ to return to the high state (FIG. 18), and allowing the shift register F$\phi$C to capture more data.

Figure 24A:
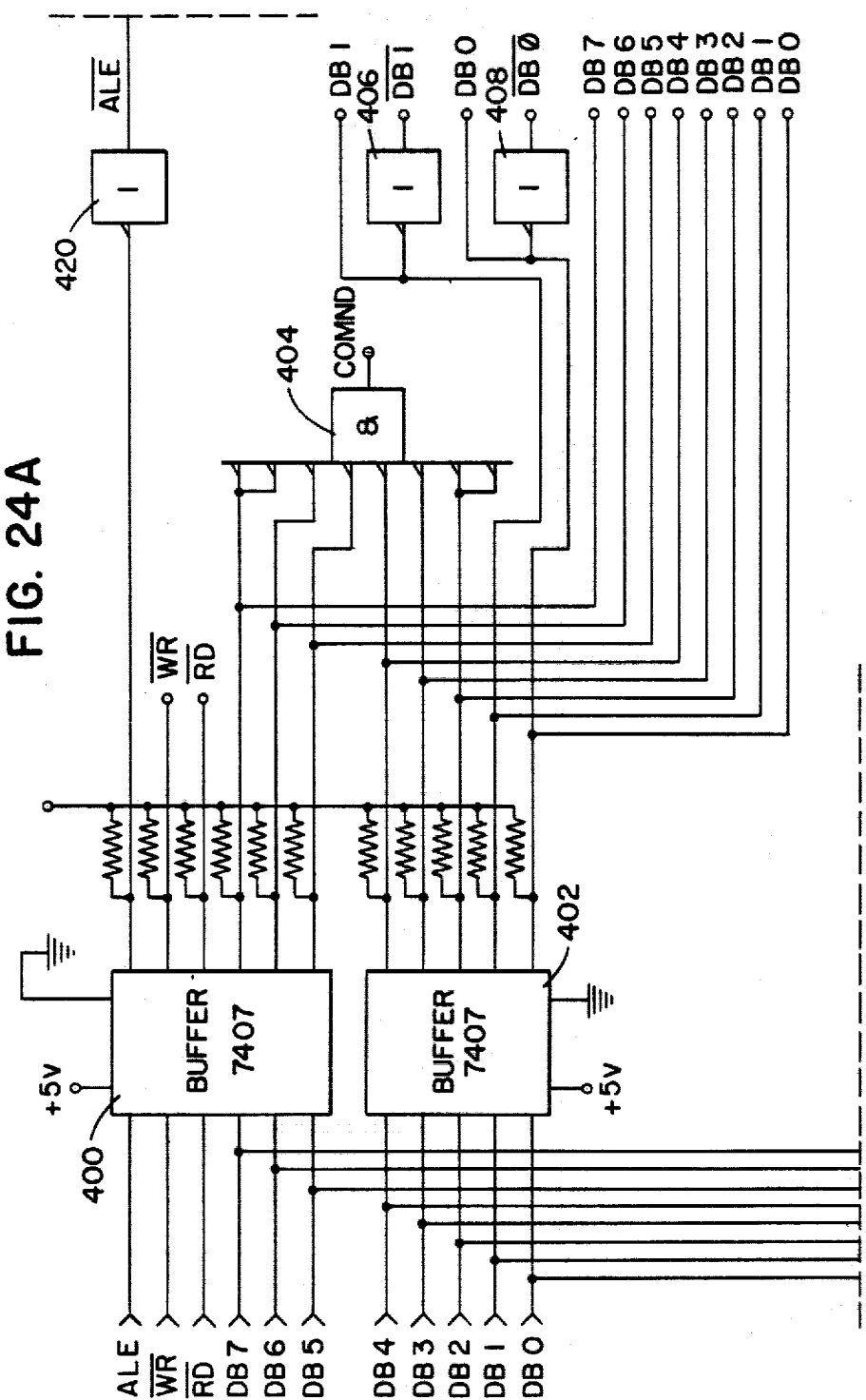
FIGS. 24A–24C inclusive taken together show the microprocessor command decode logic.
Figure 24B:
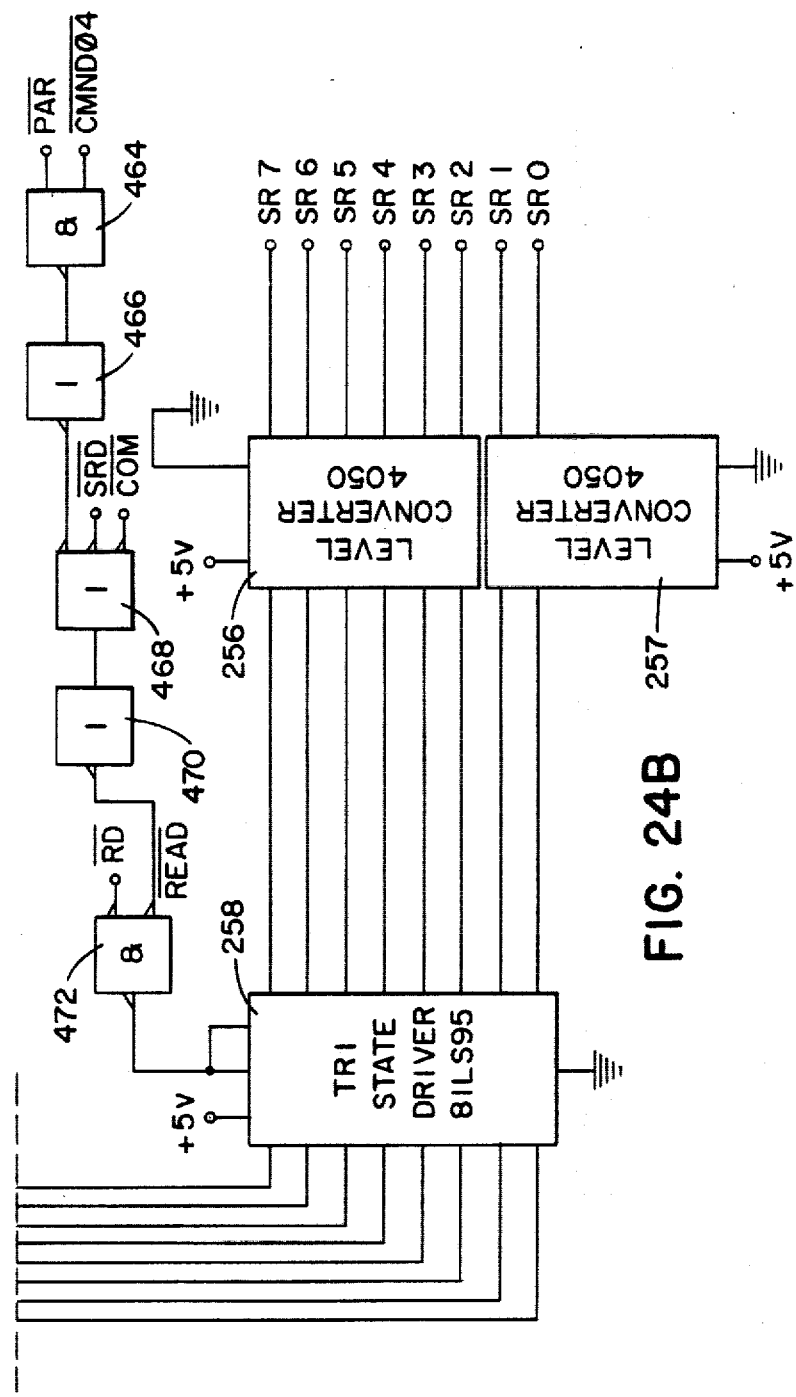
Figure 24C:
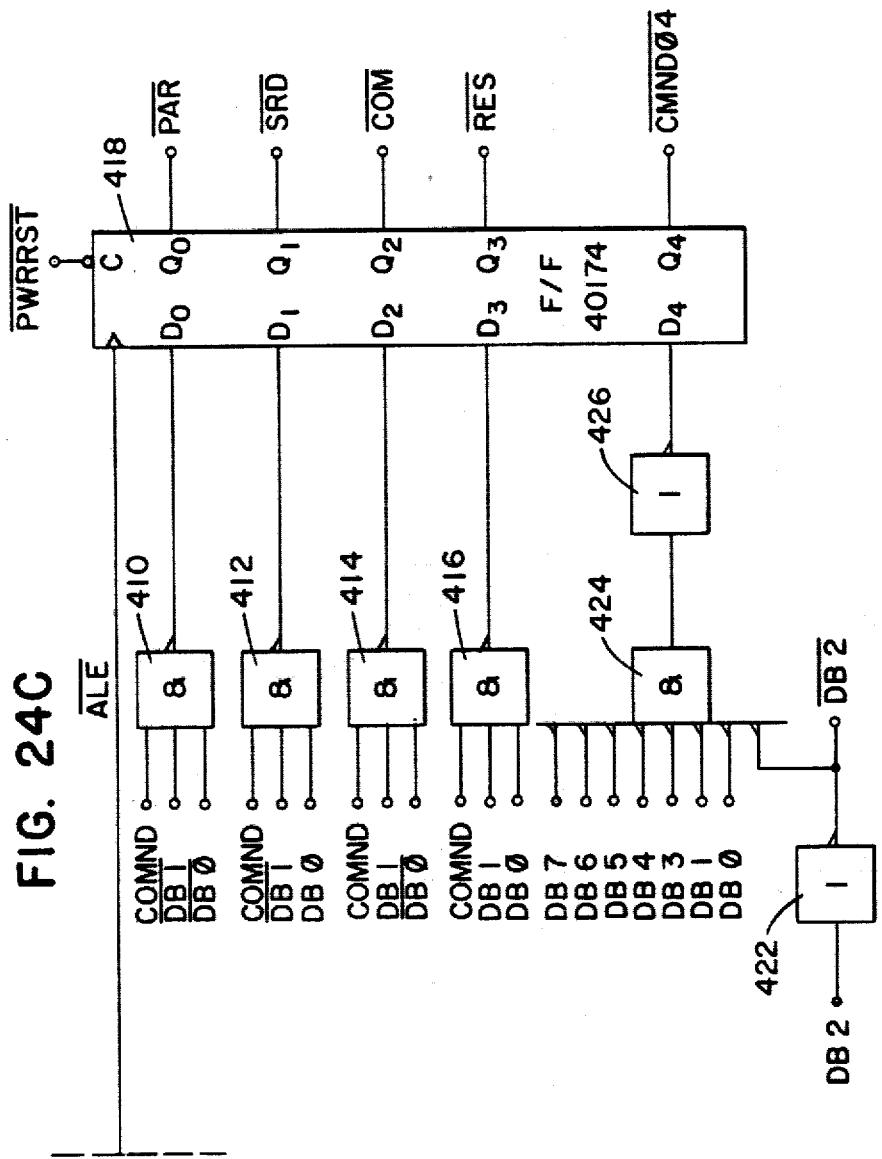

Referring now to FIG. 24A-24C inclusive, the microprocessor DB data bus 29 (FIG. 7B) contains eleven bus lines: data lines DB0-DB7, ALE (Address Latch Enable), $\overline{WR}$ (Write), and $\overline{RD}$ (Read). The bus lines are connected to buffers 400 and 402. The data lines DB2 through DB7 are connected to the inverted inputs of an AND gate 404 whose output signal COMND, is used to decode the microproocessor read ($\overline{RD}$) and write ($\overline{WR}$) memory commands into special chip commands. The DB$\phi$ and DB1 data lines from buffer 402 are inverted by gates 406 and 408, and the four signals, DB1, $\overline{DB1}$, DB0, $\overline{DB0}$ together with the COMND signal are decoded by NAND gates 410-416 (FIG. 24C) to generate the command signals $\overline{PAR}$, $\overline{SRD}$, $\overline{COM}$, and $\overline{RES}$ which are clocked into a flip-flop 418 by the signal $\overline{ALE}$ from buffer 400, which is inverted by a gate 420 (FIG. 24A). The bus lines DB$\phi$, DB1, and DB3 through DB7 are combined with the bus line DB2 outputted from an inverter gate 422, by an AND gate 424 and an inverter 426 to generate the signal CMND$\phi$4, which is also stored in flip-flop 418. The command signal $\overline{CMND\phi 4}$, $\overline{PAR}$, $\overline{SRD}$, $\overline{COM}$, and RES are combined with the $\overline{WR}$ and $\overline{RD}$ signals from the microprocessor to generate the command functions for the frame control chip.

Figure 25:
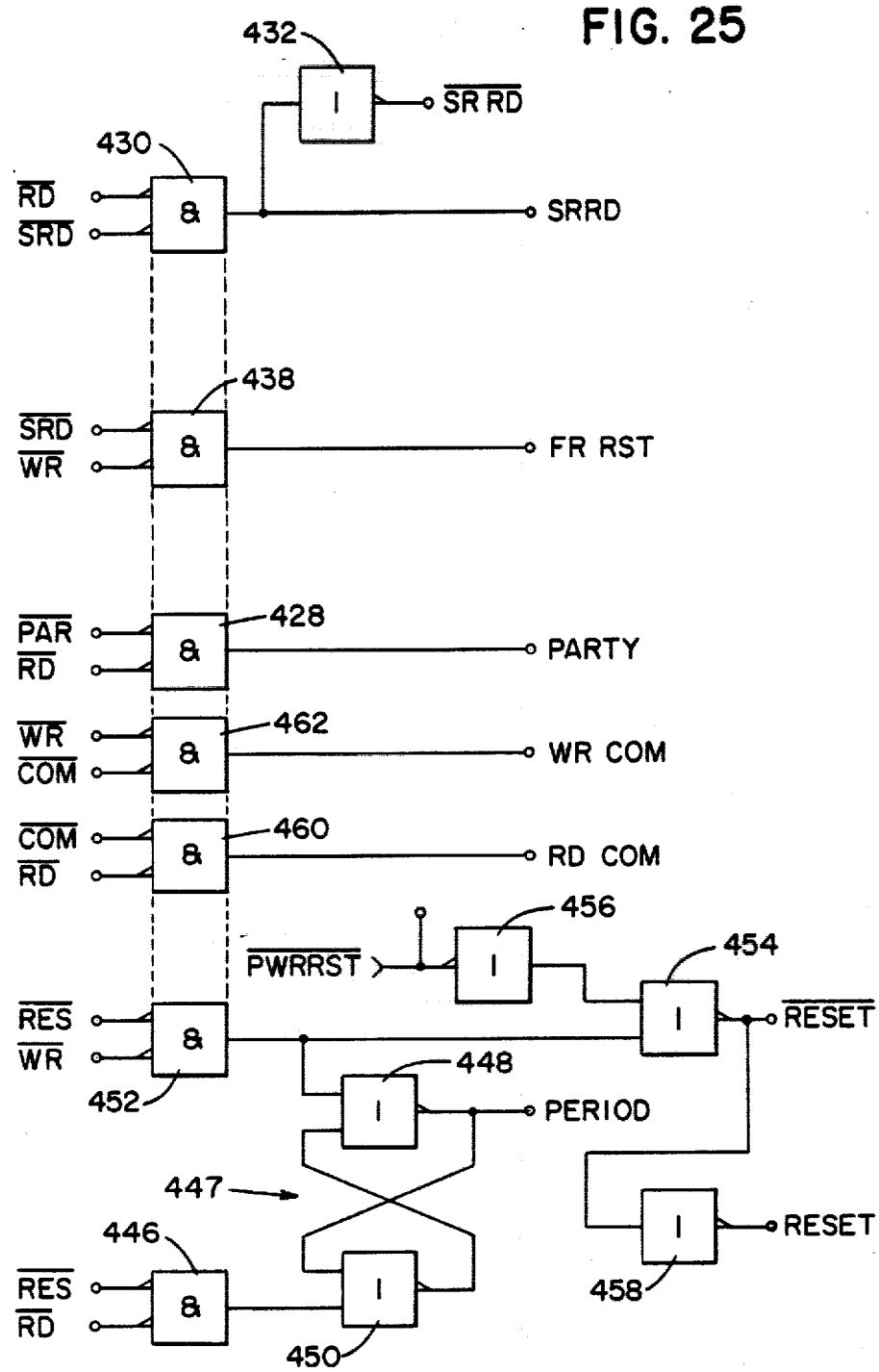
FIG. 25 is a diagram showing the logic circuits for generating the shift register used, frame reset, parity read, chip reset, and terminal read and write commands.

Referring now to FIG. 25, the $\overline{RD}$ signal is transmitted along with the $\overline{PAR}$ signal from flip-flop 418 to the inverted inputs of an AND gate 428 to generate the signal PARTY (microprocessor command $\phi\phi RD$). This signal, which is the parity read command, causes a valid parity segment which is captured in a shift register to be sent to the parity decode ROM 99 (FIG. 7B) via the SR data bus 88. The $\overline{RD}$ signal is also transmitted along with the $\overline{SRD}$ signal from flip-flop 418 (FIG. 24C) to the inverted inputs of an AND gate 430 (FIG. 25) to generate the signal SR RD ($\phi 1$ RD). This signal, which is the shift register read command, causes a valid captured data segment from a currently active shift register to be clocked onto the SR data bus and sent to the microprocessor. The SR RD signal is then transmitted through an inverter gate 432 to generate $\overline{SR\ RD}$. The $\overline{RD}$ signal is also transmitted along with CMND$\phi$4 from flip-flop 418 to the inverted inputs of an AND gate 434 (FIG. 26) to generate the signal PARDEC ($\phi 4$ RD), which is the parity decode command, and allows the microprocessor to read the parity bit information from the parity decode ROM 99 (FIG. 7B). This signal is also transmitted through an inverter 436 (FIG. 26) to generate the $\overline{PARDEC}$ signal.

Figure 26:
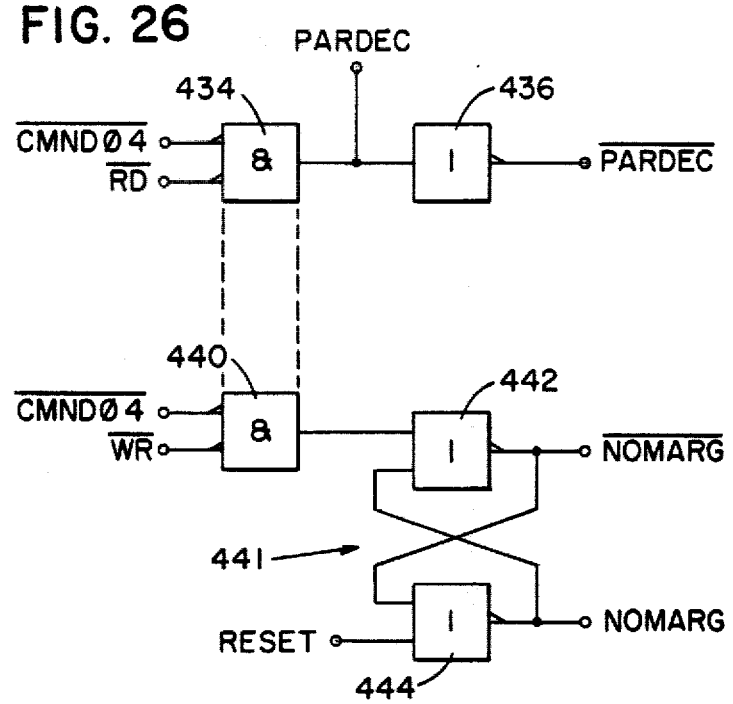
FIG. 26 is a diagram showing the logic circuits for generating the read parity and set nomarg commands.

The $\overline{WR}$ signal generated by the microprocessor 30 is transmitted along with the $\overline{SRD}$ signal to the inverted inputs of an AND gate 438 (FIG. 25) to generate the FR RST signal (φ1 WR). This signal, which is the frame reset command, allows a shift register that has previously stored data to start collecting new data. The $\overline{WR}$ signal is also transmitted along with the $\overline{CMND\phi4}$ signal to the inverted inputs of an AND gate 440 (FIG. 26) whose output is connected to a latch 441 formed by gates 442 and 444 (FIG. 26). The output signal NOMARG (φ4 WR) of gate 444 allows segment captures by the shift registers without a margin requirement. The latch 441 is cleared by transmitting the signal RESET to an input to gate 444.

A pair of microprocessor command signals are used to control the reading of periodical symbols. These signals include the $\overline{RD}$ signal which is transmitted along with the $\overline{RES}$ signal from flip-flop 418 (FIG. 24C) to the inverted inputs of an AND gate 446 (FIG. 25) whose output is connected to a latch 447 formed by NOR gates 448 and 450. The output of gate 448, the PERIOD signal (φ3 RD), is the set periodical command, which enables the FφC shift register 81c (FIG. 7A) to capture a periodical tag. The latch 447 is reset by receiving the $\overline{WR}$ signal along with the $\overline{RES}$ signal applied to the inverted inputs of an AND gate 452. The output of gate 452 (FIG. 25) is connected to one input of gate 448 of the latch 447, and is also connected to one input of a NOR gate 454. The output signal ($\overline{RESET}$ (φ3 WR)), is the chip reset command, which causes a general reset of the logic contained on the chip. The other input to gate 454 is connected to the output of an inverter 456 on whose input appears the PWRRST signal. This signal also causes a general reset of the chip logic via the $\overline{RESET}$ signal. The $\overline{RESET}$ signal is transmitted to an inverter 458 which outputs the signal RESET. The RESET signal sets the frame counter to FRφ, resets the data captures of all twelve shift registers, and clears the send and receive logic of the host communication/OCIA interface in the manner previously described.

A pair of memory command signals are used to enable the microprocessor 30 (FIG. 7B) to communicate with the terminal 34 via the OCIA 32 and host communication interface 94. The $\overline{RD}$ signal is transmitted along with the $\overline{COM}$ signal from flip-flop 418 (FIG. 24C) to the inverted inputs of an AND gate 460 (FIG. 25). The output signal RD COM (φ2 RD) of gate 460, allows the microprocesor to read data from the terminal which has been stored in a register in the OCIA. The $\overline{WR}$ signal is transmitted over the bus along with the $\overline{COM}$ signal from flip-flop 418 to the inverted inputs of an AND gate 462 (FIG. 25) to generate the WR COM signal (02 WR). This signal allows the microprocessor to send data to the terminal via the OCIA.

The $\overline{READ}$ signal (FIG. 24B) which controls the tristate driver 258 that regulates the SR bus is generated by microprocessor memory command signals $\overline{PAR}$ and $\overline{CMND\phi4}$ which are transmitted from the flip-flop 418 (FIG. 24C) to the inputs of a NAND gate 464. The output of gate 464 is inverted by an inverting gate 466 whose output is connected to an inverted input of an OR gate 468. The other signals which are transmitted to the inverted inputs of gate 468 from the flip-flop 418 are $\overline{SRD}$ and $\overline{COM}$. The output of gate 468 is inverted by an inverting gate 470 whose output signal $\overline{READ}$, is coupled to an inverted input of a NAND gate 472. The other input of gate 472 contains the signal $\overline{RD}$. The output of gate 472 is connected to the enabling input of tri-state driver 258 enabling data to be transmitted to the microprocessor. Both $\overline{RD}$ and $\overline{READ}$ must be low in order for data to travel from the SR data bus to the microprocessor.

The terminal 34 (FIG. 7B) is able to communicate with the microprocessor 30 via the OCIA 32 and host communication interface 94. Data which is to be sent from the microprocessor 30 to the terminal 32 enters a shift register 500 (FIG. 27) from the DB data bus lines DB0-DB7 inclusive. The microprocessor outputs a signal WR COM to the parallel load input of shift register 500 to allow the data to be loaded from the lines DB0-DB7. The signal WR COM is also transmitted to the master set input of a flip-flop 502. The output of flip-flop 502 is connected to an inverted input of an AND gate 504, with the signal WR COM appearing on the other inverted input. The output signal R DATA of gate 504 notifies the terminal 34 that there is data at the host communication interface 94. The signal WR COM is also transmitted to the master clear input of a flip-flop 506 whose Q output is inverted by a gate 508. The output signal $\overline{SENT}$ of inverter 508, notifies the microprocessor 30 (FIG. 29) when the data has been clocked out of the host communication interface 94 to the terminal. When the WR COM signal goes high, it causes the $\overline{SENT}$ signal to go high, indicating that the data is ready to be sent.

Figure 27:
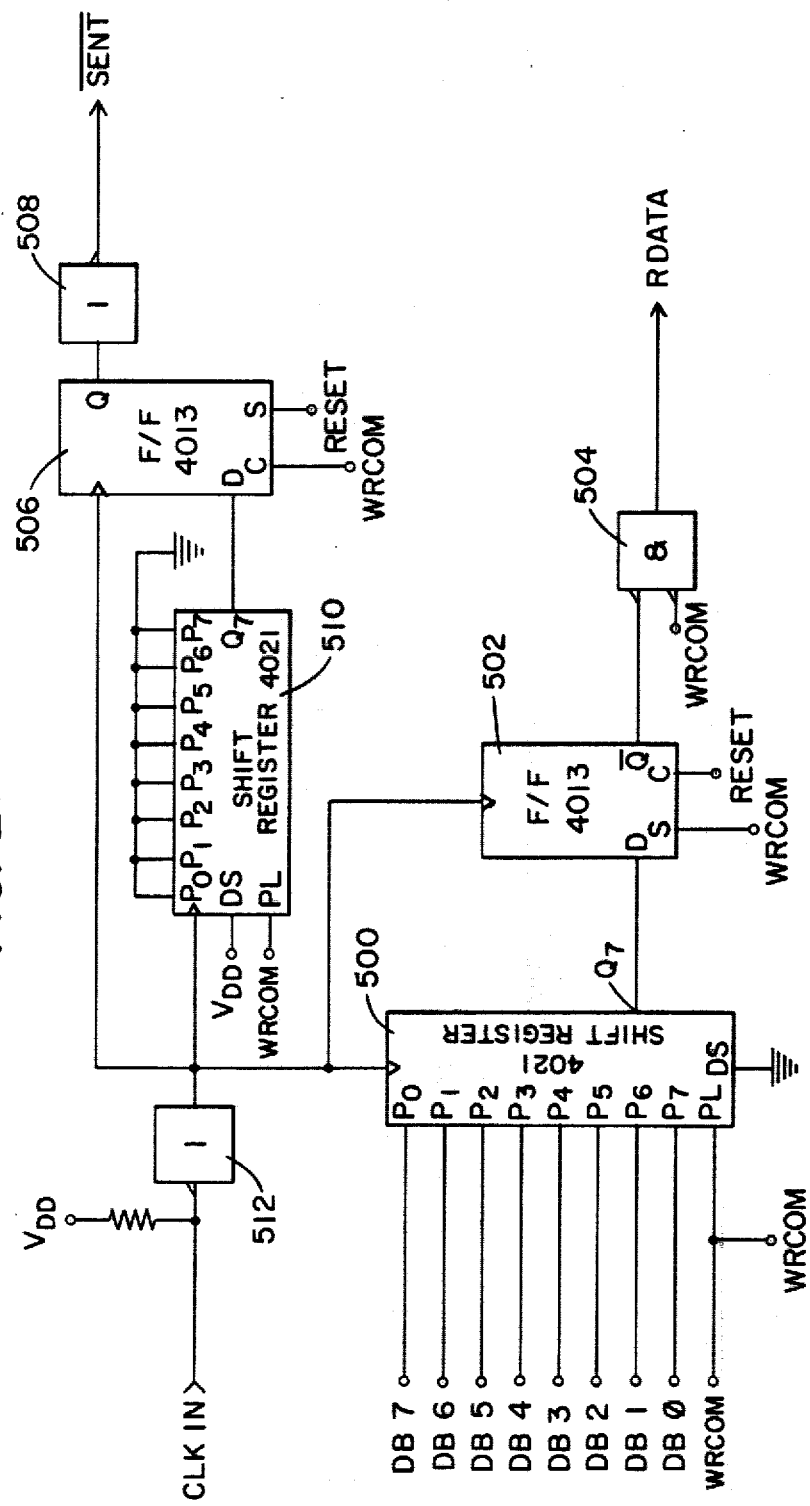
FIG. 27 is a diagram showing the logic circuitry for sending data from microprocessor to the terminal.

The signal WR COM is also transmitted to the parallel load input of a shift register 510 (FIG. 27). This shift register counts the clocking pulses $\overline{CLKIN}$, which clock the data from the host communication interface to the terminal. When the terminal is ready to receive the data, it transmits a series of pulses on the $\overline{CLKIN}$ line to shift registers 500 and 510 and flip-flops 502 and 506, via an inverter 512. The first eight $\overline{CLKIN}$ pulses clock the data from the DB data lines DB0-DB7 inclusive (FIG. 27) through shift register 500, flip-flop 502, and gate 504, over the R DATA line and through the OCIA to the terminal. The ninth CLKIN pulse causes the output of flip-flop 506 to go high, forcing the $\overline{SENT}$ signal to go low, indicating that all the data has been sent to the terminal.

Figure 28:
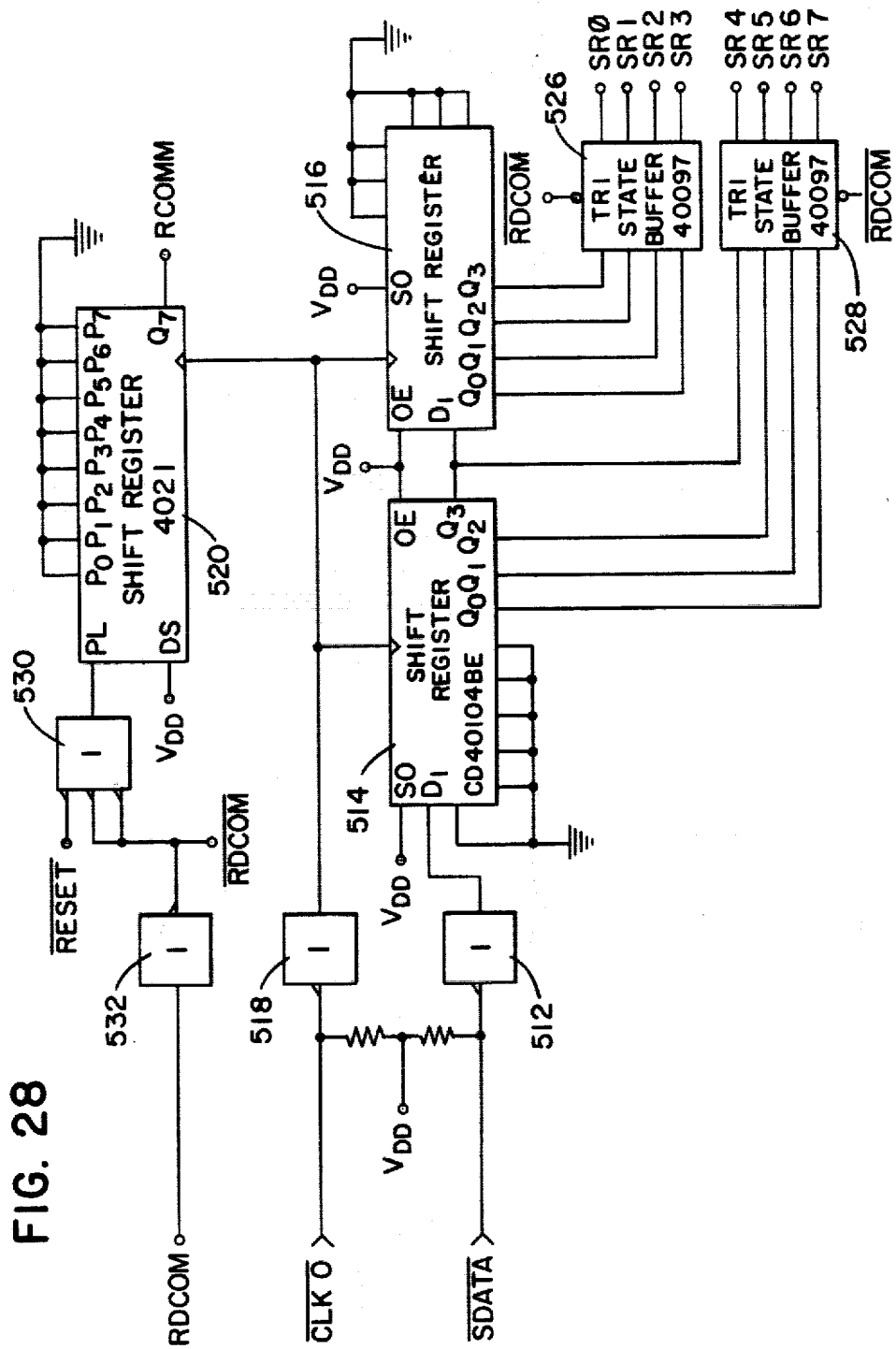
FIG. 28 is a diagram showing the logic circuitry for sending data from the terminal to the microprocessor.

When the terminal has data to send to the microprocessor, it sends the data to the host communication interface serially via the $\overline{SDATA}$ line (FIG. 28). The data is transmitted to shift registers 514 and 516 via an inverter 512. The terminal clocks the data into the shift registers with a $\overline{CLK\ 0}$ signal, which is inverted by a gate 518 and is transmitted to shift registers 514, 516, and 520. When a byte of data has been clocked into shift registers 514 and 516, the output of shift register 520, which counts the $\overline{CLK\ 0}$ clock pulses, goes high. This output signal R COMM is transmitted to a NOR gate 522 (FIG. 18) whose output is connected to the inverted input of NOR gate 247. The output signal $\overline{SYMCAP}$ of gate 247 goes low when R COMM goes high, signalling the microprocessor to read the SR data bus.

The signal R COMM is also transmitted to the tristate buffer 253 (FIG. 19). When the microprocessor reads the SR data bus, by generating the $\overline{SR\ RD}$ signal, the R COMM signal is transferred to the SR7 of the SR data bus line via buffer 253. Since the R COMM signal is high, the microprocessor, seeing that line SR7 is high, knows that there is data from the terminal waiting to be read. The microprocessor now generates a RD COM signal, which enables the tri-state buffers 526 and 528 (FIG. 28), sending the terminal data onto the SR data bus and over to the microprocessor. Signal RD COM is also transmitted to an OR gate 530 via an inverter 532. Gate 530 causes a reset of shift register 520.

Figure 29:
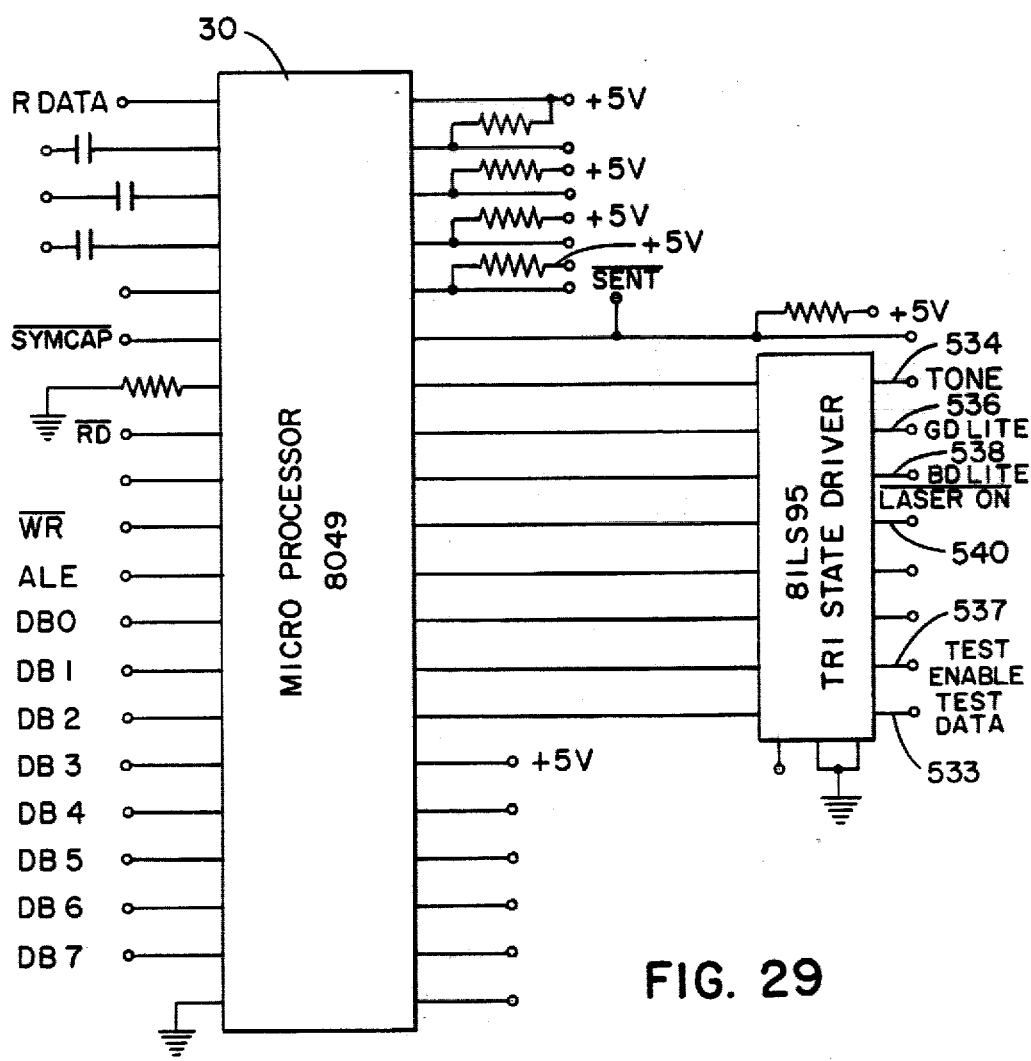
FIG. 29 is a diagram showing the microprocessor and its associated logic circuitry.

As shown in FIG. 29, the microprocessor 30 has four output lines available for the slot scanner which are outputted from driver 533 and include line 534 for tone, line 536 for good light, line 538 for bad light, and line 540 for laser on. The tone signal controls an audible signal which sounds whenever a label is read. The good light signal lights a light indicating the label read was valid. The bad light signal lights a light indicating the label read was invalid, while the LASER ON signal controls the window shutter, which allows the laser beam to come out. Also outputted on lines 537 and 539 are the test signals TEST ENABLE and TEST DATA which are transmitted to the counter control chip 22 (FIG. 6) to initiate a diagnostic routine for the circuits in the chips 24 and 28 in a manner that will now be described.

Figure 31B:
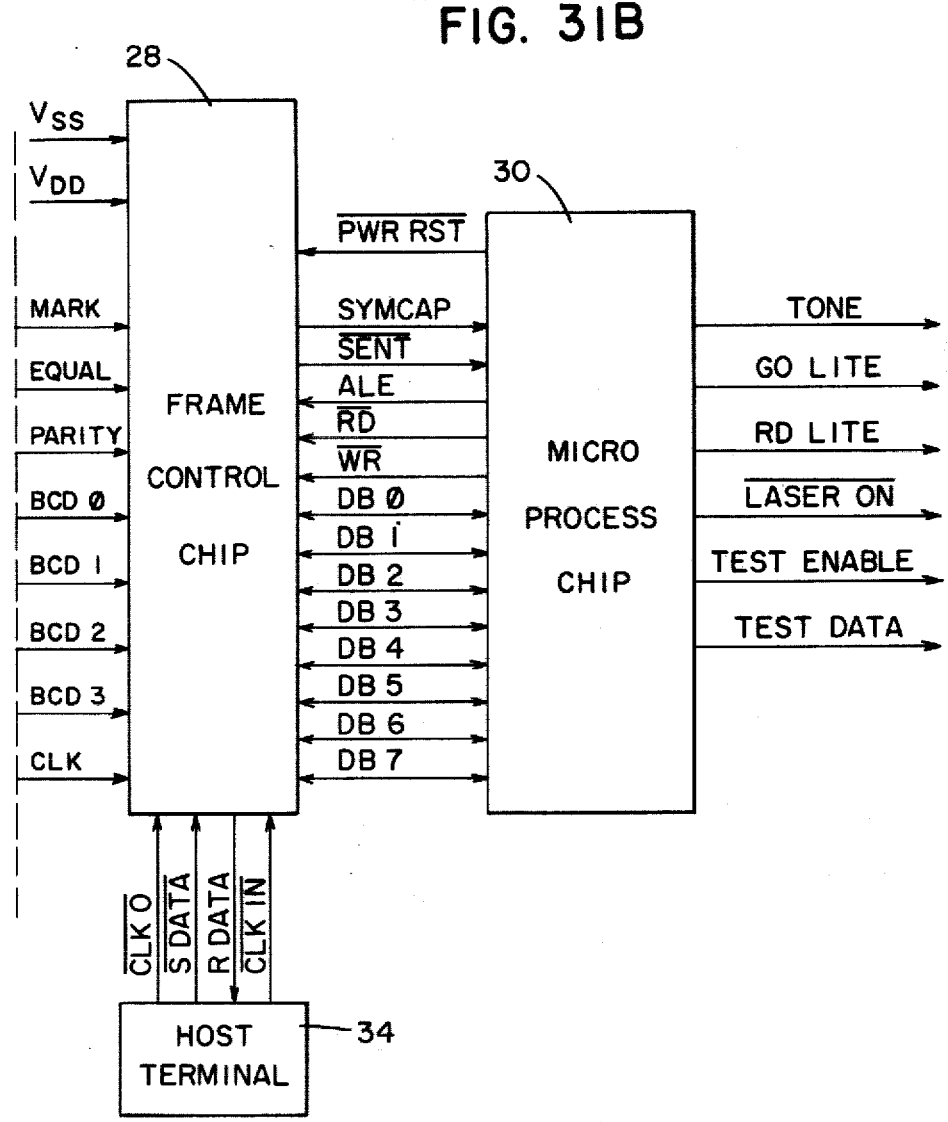

Referring now to FIGS. 31A and 31B taken together show the decoding system of FIG. 6, incorporated in a plurality of semiconductor integrated circuit chips in which the slot scanning unit 20 will output the transition pulses $\overline{\text{RTV}}$, and $\overline{\text{STV}}$ to the counter control chip 22 in which is located an interval counter for counting the interval between the generation of the transition pulses $\overline{\text{RTV}}$ and $\overline{\text{STV}}$ together with a first-in, first-out (FIFO) storage unit 96 (FIG. 8A). The FIFO outputs to the decoder chip 24 the signals VIDEO, CLK and eleven bits of data D0–D10 inclusive representing an interval count in the manner described previously. The decoder chip 24 which is described in detail in the co-pending applications NCR Ser. Nos. 043,933 and 043,929 previously cited is an NMOS/LSI chip. The decoder chip 24 will output a 4-bit hexadecimal number comprising bits BCD0–BCD3 inclusive together with the signals MARK, EQUAL, PARITY and CLK to the frame control chip 28 which is fully described in detail in the co-pending patent applications NCR Docket Nos. 2842 and 2882 previously cited. The frame control chip 28 is a NMOS/LSI chip.

As previously described, the hexadecimal number being outputted by the decoder chip 24 contains valid and invalid character designations. The frame control chip 28 using the signals MARK, EQUAL and PARITY will separate the valid characters from the invalid characters and then output the control signal SYMCAP to the microprocessor chip 30 (FIG. 29) which will then generate the control signals ALE, $\overline{\text{RD}}$ and $\overline{\text{WR}}$ enabling the valid characters stored in the frame control chip 28 to be outputted either to the microprocessor chip over lines DB0–DB7 inclusive or to a host terminal 34 over the line RDATA in response to receiving the clocking signals $\overline{\text{CLK IN}}$ from the host terminal 34. The microprocessor chip 30 in addition to processing the valid characters stored in the frame control chip 28 will check the data transmitted from the frame control chip 28 and indicate the validity of the read operation by issuing the signals GD LITE if the read was a valid read or the signal BD LITE is the read operation was invalid. The microprocessor chip 30 will also generate a signal TONE which controls the issuing of an audio signal to the operator indicating the type of read that has occurred together with the signal $\overline{\text{LASER ON}}$ which turns on the laser in the slot scanner unit 20 to initiate a read operation. As will be described more fully hereinafter, the microprocessor chip 30 will generate the diagnostic signals TEST ENABLE and TEST DATA which are transmitted to the counter control chip 22 resulting in a test symbol being generated for transmission through the decoder chip 24 and the frame control chip 28 enabling the microprocessor chip 30 to provide a diagnostic routine of the decoding system.

Figure 32:
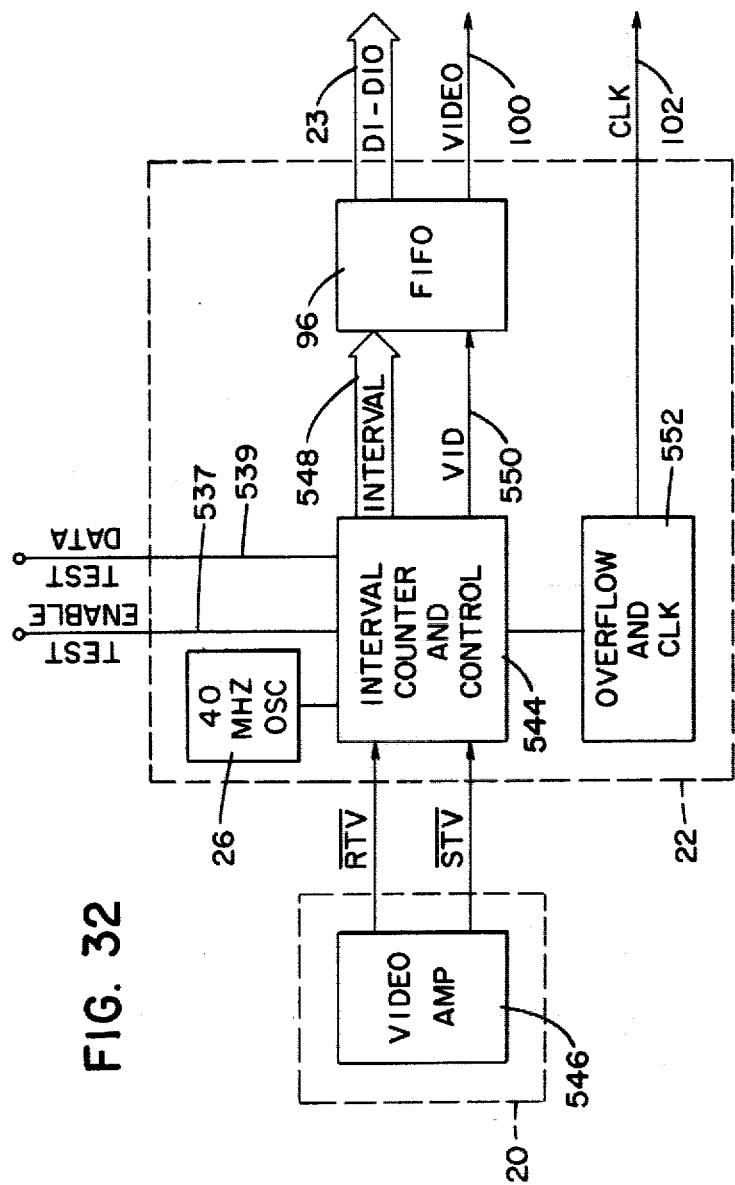
FIG. 32 is a detailed block diagram of the slot scanner unit and the counter control chip.

Referring now to FIG. 32, there is shown a more detailed block diagram of the counter control chip 22 (FIG. 31A) which includes an interval counter and control unit 544 which outputs a binary count representing the interval between the generation of the video signals $\overline{\text{RTV}}$ and $\overline{\text{STV}}$, which signals are generated by a video amplifier 546 located in the slot scanner unit 20 and which operates in a manner that is wellknown in the art. As will be described more fully hereinafter, the interval counter and control unit 544 will output an 11-bit binary count representing the width of the interval over the bus 548 to the FIFO storage unit 96 (FIG. 32) which also receives over line 550 the signal VID which is generated by the VIDEO flip-flop 620 (FIG. 33C) located in the control unit 544 and which represents the interval being processed as a bar or a space. The VID signal is outputted by the FIFO 96 as the signal VIDEO over line 100 together with the 11-bit binary count D1–D10 inclusive over bus 23 to the decoder chip 24 (FIG. 31A) enabling the decoder chip to decode the binary count and output data representing characteristics of the interval being generated by the slot scanner unit 20 as fully disclosed in the previously-cited co-pending application of Amacher et al., Docket No. 2841. Also included in the counter control chip 22 is a 40 Mhz. oscillator 26 which provides the system clock and an overflow and clock unit 552 which outputs over line 102 to the decoder chip 24 a clock signal CLK which is used as an error signal when an overflow occurs in the interval counter. As fully described in the previously-cited Amacher et al. co-pending application Docket No. 2841, an overflow condition occurs when the interval counter reaches a predetermined count without being interrupted by one of the signals $\overline{\text{RTV}}$ and $\overline{\text{STV}}$.

Figure 33B:
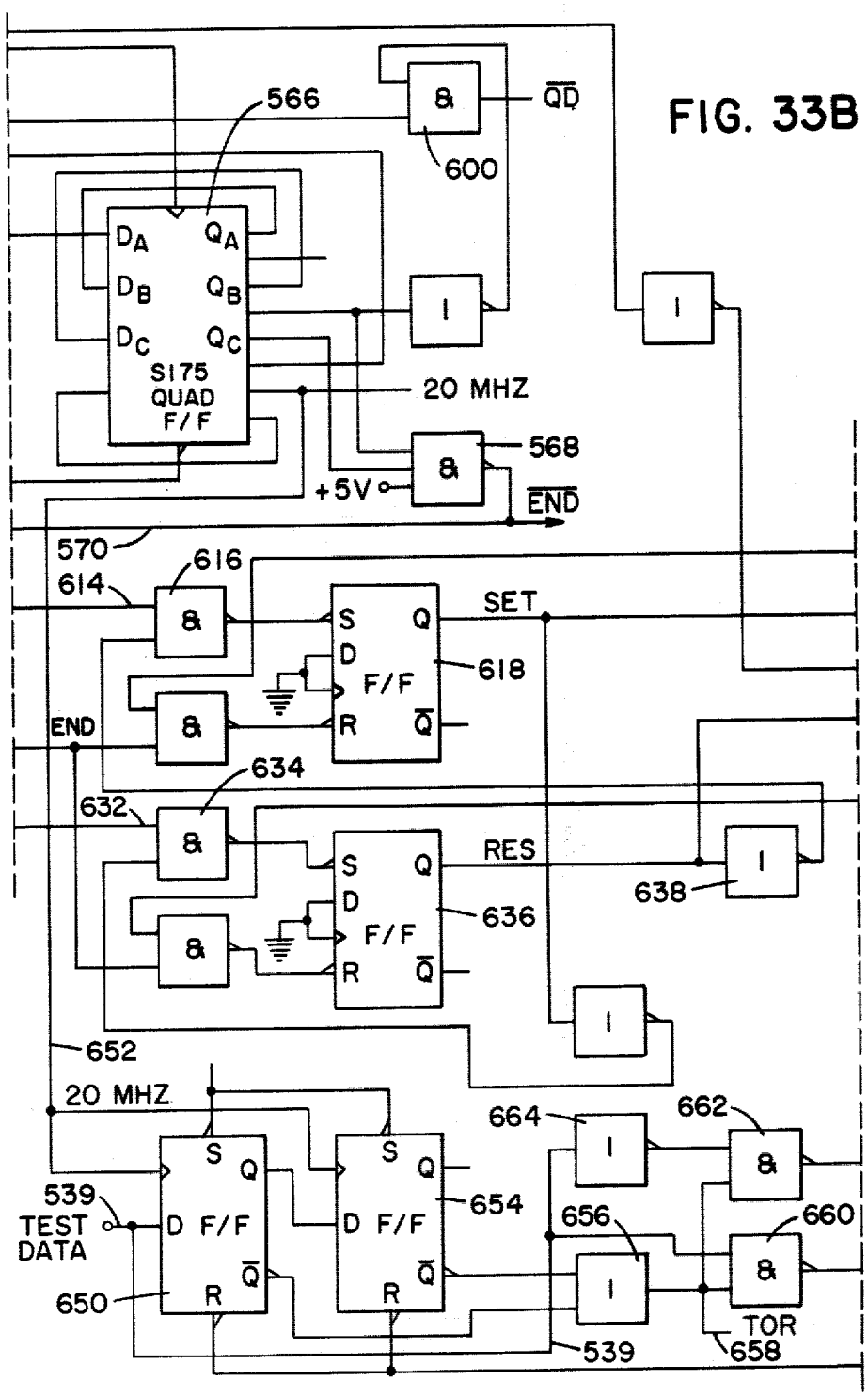

Referring now to FIGS. 33A–33C inclusive, taken together, disclose a portion of the interval counter and control unit 544 (FIG. 32). As shown in FIG. 33A, whenever the transition signal STV goes low indicating the transition from a space to a bar, the signal is transmitted through the driver 554 to one inverted input of the AND gate 556 whose other inputs have the signals VID and TEST ENABLE appearing thereon each being low at this time, thereby enabling the AND gate 556 to output a high signal through a NOR gate 558 to the set input of a flip-flop 560 setting the flip-flop. The setting of the flip-flop 560 results in the Q output signal going high, which signal is transmitted to the AND gate 562 whose other input is connected to the 40 Mhz. oscillator 26. The setting of the flip-flop 560 enables the AND gate 562 to gate the clock pulses from the oscillator 26 which appear as clock pulses JCK to a Quad flip-flop 564 which forms together with a second Quad flip-flop 566 (FIG. 33B) a Johnson counter which will initiate a count at this time.

The Johnson counter counts up to a predetermined count during which time an interval counter 574 (FIG. 33A), which will be described more fully hereinafter, is enabled to output a count contained therein as a result of a previous counting operation to the FIFO 96 (FIG. 32). In the present embodiment, the Johnson counter will count up to count 14 at which time it will output through a NAND gate 568 (FIG. 33B) the signal $\overline{\text{END}}$ which signal is transmitted over line 570 to the reset input of the flip-flop 560 (FIG. 33A), thereby resetting the flip-flop. The signal $\overline{\text{END}}$ is also transmitted over line 570 to the reset input of a D-type flip-flop 572 (FIG. 34A) which is the first stage of the interval counter generally indicated by the numeral 574 and which comprises the flip-flops 572, 576–578 (FIGS. 34A–34C inclusive) and the counter 588. As will be described more fully hereinafter, the interval counter 574 will be present to generate a count until the next transition signal $\overline{\text{RTV}}$ is received, which signal is transmitted through the driver 590 (FIG. 33A), the AND gate 592 and the NOR gate 558 to the set input of the flip-flop 560 again setting the flip-flop which initiates the operation of the Johnson counter in the manner described previously. The setting of the flip-flop 560 will result in the Q output of the flip-flop going low, which signal is transmitted to one input of an AND gate 594 whose other input is coupled to the output of the 40 Mhz. oscillator 26. The setting of the flip-flop 560 will disable the AND gate 594 from gating the clock signals ICK transmitted from the 40 Mhz. oscillator 26 over line 596 to the clock input of the first stage flip-flop 572 of the interval counter 574, thereby stopping the counter. It will be seen from this arrangement that when the flip-flop 560 is reset at the end of the Johnson counter operation by the signal $\overline{\text{END}}$, the AND gate 594 will be enabled to transmit the clock pulses ICK to the interval counter 574 thereby enabling the counter 574 to continue its counting operation.

The operation of the Johnson counter 563 (FIGS. 33A and 33B) as the result of the setting of the flip-flop 560 results in the generation of the signal $\overline{\text{QD}}$ (FIG. 33B). The signal $\overline{\text{QD}}$ appearing on the output of the AND gate 600 (FIG. 33B) is transmitted through an inverter 602 (FIG. 34B) and to each of the flip-flops 576–586 inclusive and the counter 588 (FIGS. 34A–34C inclusive) presetting the interval counter. In the present embodiment, the Johnson center will count up to 14 at which time it will generate the signal $\overline{\text{END}}$. The signal ICK is then generated, which allows the interval counter to start counting. Upon the generation of each transition signal $\overline{\text{STV}}$ or $\overline{\text{RTV}}$ resulting in the setting of the flip-flop 560 and the operation of the Johnson counter 563, a signal $\overline{\text{QA}}$ is outputted from an AND gate 604 (FIG. 33A) which signal is transmitted to a clock source (not shown) resulting in a clocking signal being transmitted to the FIFO 96 (FIGS. 34A and 34B) which signals clock the binary count output of the interval counter 574 through the FIFO and out over the output lines D0–D10 inclusive for transmission to the decoder chip 24 (FIG. 31B).

The generation of the transition signals $\overline{\text{STV}}$ and $\overline{\text{RTV}}$ (FIG. 33A) also results in the outputting of a signal VIDEO (FIG. 34B) indicating whether the interval being counted is a bar or a space. If the signal VIDEO is high, the interval is a bar, and when the signal VIDEO is low, the interval is a space. As shown in FIG. 33A, the sinal STV will be outputted as a high signal from the AND gate 556, which signal is transmitted over line 608 to the inverter 610 and through the NAND gate 612 (FIG. 33A) whose other input signal TS is low at this time and over line 614 to one input of the NAND gate 616 (FIG. 33B) which outputs the low signal to the inverting set input of a D-type flip-flop 618. The setting of the flip-flop 618 results in the Q output signal SET going high, which signal is transmitted to the J input of flip-flop 620 (FIG. 33C) setting the flip-flop resulting in the Q output signal VID going high, which represents the interval as a bar. The signal VID is transmitted over line 622 to one input of a NAND gate 624 (FIG. 34C), which signal is clocked through the gate 624 by a system clock $\overline{\text{CI}}$ through an OR gate 626 to the FIFO 96 (FIG. 34B) which after transmission through the FIFO appears as signal VIDEO or the output of the FIFO 96.

Upon the occurrence of the generation of the transition signal $\overline{\text{RTV}}$ indicating the interval to be a space, the signal is transmitted through the inverter 590, the AND gate 592, the inverter 628 (FIG. 33A), the NAND gate 630 and over line 632 to the NAND gate 634 (FIG. 33B). The signal is gated by the NAND gate 634 to the set input of the flip-flop 636 setting the flip-flop which results in the Q output signal RES going high. The signal RES is then transmitted through the inverter 638 and to one input of the NAND gate 616, thereby disabling the NAND gate 616 from transmitting the high signal appearing on line 614 to the set input of the flip-flop 618. The flip-flop 618 will be toggled by the next clock signal whereby the Q output signal SET will go low, resulting in the toggling of the JK flip-flop 620, whereby the $\overline{\text{Q}}$ outpt signal $\overline{\text{VID}}$ will go low while the Q output signal VID will go high. The signal VID going low will result in the signal VIDEO appearing on the output of the FIFO going low, thereby indicating that the interval being scanned is a space.

If the slot scanner unit 20 (FIG. 31B) is scanning a margin or something other than the code bar symbol, the interval counter 574 (FIGS. 34A–34C inclusive) will count to a predetermined count at which time the counter 588 (FIG. 34C) will output a signal over line 640 to one input of a NAND gate 642 enabling the NAND gate to output the overflow signal $\overline{\text{OVF}}$, which signal is transmitted over line 644 to one input of an OR gate 646 (FIG. 34B) which outputs a signal to the interval counter 574 presetting the counter to a predetermined count. This count enables the processing of all the intervals scanned by the slot scanner 20 to be completed.

As described previously, the microprocessor 30 will output the signals TEST ENABLE and TEST DATA from a driver 533 (FIG. 29) over lines 537 and 539 to the interval counter and control unit 544 (FIG. 32) to initiate a diagnostic routine for the system. The signal TEST ENABLE is high while the signal TEST DATA is toggled, simulating the transitions found on a symbol. As shown in FIG. 33B, the signal TEST DATA appearing on line 539 is transmitted to the D input of the flip-flop 650 to toggle said flip-flop upon the occurrence of the next leading edge of the 20 Mhz. clock signal. When the TEST DATA goes high simulating the presence of a bar, the Q output signal of flip-flop 650 goes high, and the $\overline{\text{Q}}$ output signal goes low. A second flip-flop 654, which has its D input connected to the Q output of flip-flop 650, has its $\overline{\text{Q}}$ output signal initially at a high level. The $\overline{\text{Q}}$ output of flip-flop 650 and the $\overline{\text{Q}}$ output of flip-flop 654 are connected to the inputs of an exclusive OR gate 656. The output of gate 656, the signal TOR, goes high. The signal TOR is transmitted to one input of a NAND gate 660 and a second NAND gate 662 on whose other input appears the signal TEST DATA, which is high, and which signal is transmitted through an inverter 664 to the other input of gate 662. The output of gate 660 goes low and is transmitted through an inverter 666 before appearing on one input of the NAND gate 668 as a high signal. Appearing on the other input to the NAND gate 668 is the high signal TEST ENABLE resulting in the NAND gate 668 outputting a low signal TS. The high signal appearing on the output of the NAND gate 662 is transmitted through an inverter 670 and to one input of a NAND gate 672 on whose other input appears the high signal TEST ENABLE, and the output of gate 672, the signal TR goes high.

The low signal TS is transmitted over line 674 to one input of the NAND gate 612 (FIG. 33A), causing a high signal on line 614, which results, as previously described, in the setting of the flip-flops 618 and 620 (FIG. 33C) in which the Q output signal VID goes high indicating a bar is represented by the binary count appearing on the output of the FIFO 96. When the signal TEST DATA goes low, the logic of FIG. 33B and FIG. 33C will result in the signal TR going low. The low signal TR is transmitted over line 676 to the NAND gate 630 (FIG. 33A) resulting in the toggling of flip-flops 636 and 620 in the manner previously described to enable the VID signal to represent a space.

Figure 35:
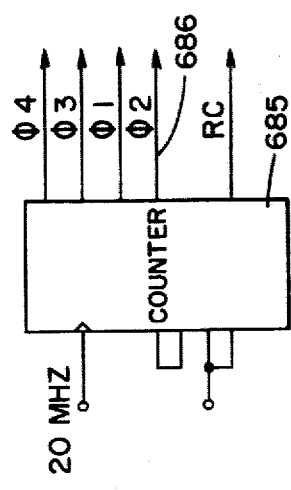
FIG. 35 is a block diagram of a counter for generating various clock signals used in the counter control unit.

As shown in FIG. 33B, the output signal TOR appearing on the output line 658 of OR gate 656 is transmitted to one input of the NOR gate 558 (FIG. 33A) enabling the setting of the flip-flop 560. As described previously, the setting of the flip-flop 560 results in the Johnson counter 563 counting up to a predetermined count and then the subsequent operation of the interval counter 574. At the time the interval counter 574 (FIG. 34A) is preset for operation, the signal TEST ENABLE transmitted to one input of the NAND gate 680 enables the NAND gate to gate a clock signal φ2 through the inverter 682 and inverter 684 to the clock input of the JK flip-flop 576 which is the second stage of the interval counter 574. As shown in FIG. 35, a 4-bit counter 685 receives the 20 Mhz. clock signal generated by the flip-flop 566 (FIG. 33B) which outputs a plurality of clock signals of which the φ 2 clock represents a frequency rate of 2½ Mhz. which clock is transmitted over line 686 to the NAND gate 680 (FIG. 34A) enabling the operation of the interval counter to occur. The counter will count the intervals generated by the toggling of the signal TEST DATA which approximates the intervals of a UPC symbol. The output count of the interval counter 574 (FIG. 34A) will be outputted by the FIFO 96 together with the signal VIDEO to the decoder chip 24 (FIG. 31) for decoding in the manner as set out in the co-pending application of Amacher et al., NCR Docket No. 2841. The decoded data will then be transferred to the frame control chip 26 and then outputted to the microprocessor 30 where the characters generated by the decoded system are checked in a table located in a ROM in the microprocessor enabling the microprocessor to generate signals (not shown) indicating the condition of the decoding system.

While the invention has been described in detail and with reference to a specific embodiment thereof, it will be understood by those skilled in the art that various changes and modifications can be made therein without departing from the spirit and scope of the invention. Therefore, it is to be understood that the present invention is not to be limited beyond that as required by the appended claims.

What is claimed is:

1. A system for decoding a coded symbol consisting of a plurality of bars and spaces which represent characters comprising;
   means for generating data representing the bars and spaces of the symbols;
   a first large scale integrated circuit chip having circuits for applying predetermined relationships to said data and for generating continuous valid and invalid characters in response to the generation of the data representing each consecutive bar and space whenever said relationships are satisfied;
   a second large scale integrated circuit chip coupled to said first integrated circuit chip for receiving said valid and invalid characters, said second circuit chip having circuits for distinguishing between the valid and invalid characters received from said first chip; and
   a processor chip coupled to said second chip for processing said valid characters upon the distinguishing of said valid characters by said second chip.

2. The decoding system of claim 1 in which each of said first and second chips in an N-type metaloxide-semiconductor device.

3. The decoding system of claim 1 in which said decoding system further includes utilization means coupled to said second chip for receiving the valid characters possessed by said processor chip.

4. The decoding system of claim 1 which said data generating means includes timing means coupled to said first chip for serially outputting said data to said first chip, said applying circuits applying said predetermined relationships to said data in parallel to generate said valid and invalid characters.

5. The decoding system of claim 1 in which the first chip includes a circuit for delaying the data a predetermined time period enabling said predetermined relationships to be satisfied during said delayed time period.

6. The decoding system of claim 1 in which said distinguishing circuit includes storage means for storing said valid and invalid characters, said distinguishing circuit further includes means for generating and transmitting a signal to said processor chip upon storing a predetermined number of valid characters in said storage means enabling said processor chip to process the valid characters stored therein.

7. The decoding system of claim 4 in which said timing means includes means for generating a binary count representing each bar and space and a first-in, first-out storage register for outputting said binary count at a predetermined interval to said first chip, said processor chip adapted to output to said timing means control signals for enabling said timing means to output a plurality of binary counts representing test characters for generating diagnostic operations of said decoding system.

8. The decoding system of claim 6 in which said first chip further includes circuit means for generating a control signal for identifying the data as a bar or space, said distinguishing circuit of said second chip responding to the generation of said control signal for enabling said storage means to store said valid characters.

9. A symbol decoding system for decoding a symbol consisting of a plurality of bars and spaces, some of which represent numerical characters separated by a center band, in margins and out margins comprising:
   means for providing a series of signals representing the transition between adjacent bars and spaces in said symbol;
   means for generating a binary count representing the interval between adjacent signals;
   means for generating a first control signal identifying each binary count as a bar or space;

a first large scale integrated circuit chip having first circuit means for outputting said first control signal, for applying a plurality of predetermined relationships among consecutive intervals and for generating data signals representing each interval either as a valid or invalid character, an in margin or out margin, or a center band whenever said predetermined relationships are satisfied, said chip further including means for generating a second control signal identifying the valid and invalid characters represented by said data signals;

a second large scale integrated circuit chip having storage means and further including second circuit means responsive to the generation of said first and second control signals for storing the data signals in said storage means and for distinguishing between the valid and invalid characters represented by the data signals stored in said storage means;

and a processor chip coupled to said second chip for processing said valid data signals upon the storing of said valid data signals by said second circuit means.

10. The decoding system of claim 9 in which said first chip further includes third circuit means for delaying the output of said first control signal a predetermined time period during which time the predetermined relationships are applied by said first circuit means.

11. The decoding system of claim 10 in which said second circuit means further includes means responsive to the generation of the data signals representing the in margin for storing in said storage means a predetermined number of valid data signals generated by said first circuit means.

12. The decoding system of claim 11 in which said second chip further includes means responsive to the storing of a predetermined number of valid data signals in said storage means for generating a third control signal notifying the processing chip of the storage of said valid data signals, said processor chip transferring the valid data signals stored in said storage means to said processor chip for processing thereby in response to the generation of said third control signal.

13. The decoding system of claim 12 in which said binary count means includes a first counter means enabled by the generation of said transition signals for generating a predetermined count, a second counter means for generating a count representing the interval between the predetermined count and the generation of the next transition signal and a storage unit coupled to the output of said second counter means for temporarily storing the output of the count of said second counter means, said output count being transferred to said storage unit during the time said predetermined count is generated by said first counter means.

14. The decoding system of claim 10 in which said second counter means is an interval counter preset by the operation of said first counter means to said predetermined count to output a count representing the interval between adjacent transition signals.

15. The decoding system of claim 14 in which said storage unit comprises a first-in, first-out shift register.

16. The decoding system of claim 9 in which said first control signal generating means comprises a bistable logic device enabled by said transition signals to output said first control signal in accordance with the type of transition signal provided by said providing means.

17. The decoding system of claim 14 in which said decoding system further includes means for generating a plurality of clock signals, said processor chip generating a plurality of test signals for testing the decoding system and means responsive to the generation of said test signals for enabling one of said clock signals to be coupled to said interval counter for outputting a binary count representing a predetermined interval for decoding by the decoding system.

* * * * *